US011142188B2

(12) United States Patent
Funke et al.

(10) Patent No.: US 11,142,188 B2
(45) Date of Patent: Oct. 12, 2021

(54) ACTION-BASED REFERENCE SYSTEMS FOR VEHICLE CONTROL

(71) Applicant: Zoox, Inc., Foster City, CA (US)

(72) Inventors: Joseph Funke, Redwood City, CA (US); Steven Cheng Qian, San Francisco, CA (US); Marin Kobilarov, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 102 days.

(21) Appl. No.: 16/732,087

(22) Filed: Dec. 31, 2019

(65) Prior Publication Data

US 2021/0197798 A1 Jul. 1, 2021

(51) Int. Cl.
*B60W 30/06* (2006.01)
*G01C 21/16* (2006.01)
*G08G 1/14* (2006.01)
*G01C 21/34* (2006.01)
*G05D 1/02* (2020.01)

(52) U.S. Cl.
CPC .............. *B60W 30/06* (2013.01); *G01C 21/16* (2013.01); *G01C 21/3461* (2013.01); *G05D 1/027* (2013.01); *G05D 1/0214* (2013.01); *G08G 1/141* (2013.01); *G05D 2201/0213* (2013.01)

(58) Field of Classification Search
CPC ... B60W 30/06; G01C 21/16; G01C 21/3461; G05D 1/0214; G05D 1/027; G05D 2201/0213; G08G 1/141
See application file for complete search history.

(56) References Cited

U.S. PATENT DOCUMENTS

2020/0285244 A1* 9/2020 Gier ................... G05D 1/0242
2020/0410255 A1* 12/2020 Guo .................... G06K 9/6256
2021/0048818 A1* 2/2021 Funke ................... B60W 30/09

* cited by examiner

Primary Examiner — Tan Q Nguyen
(74) Attorney, Agent, or Firm — Lee & Hayes, P.C.

(57) ABSTRACT

Techniques for controlling a vehicle on and off a route structure in an environment are discussed herein. A vehicle computing system controls the vehicle along a route based on a route-based reference system. The vehicle computing system may determine to operate off the route, such as to operate in reverse, park, etc. The vehicle computing system may modify vehicle operations to an inertial-based reference system to navigate to a location off the route. The vehicle computing system may determine a vehicle trajectory to the location off the route based on a reference trajectory between a location on the route and the location off the route and a corridor associated therewith. The vehicle computing system may transition between the route-based reference system and the inertial-based reference system, based on a determination to operate on or off the route.

20 Claims, 14 Drawing Sheets

200A

DETERMINE THAT ONE OR MORE PRECONDITIONS FOR PARKING ARE SATISFIED
202

DETERMINE A PARKING TRAJECTORY FROM AN INITIAL LOCATION TO A PARKING LOCATION
204

CONTROL THE VEHICLE TO THE PARKING LOCATION BASED AT LEAST IN PART ON THE PARKING TRAJECTORY
206

2B

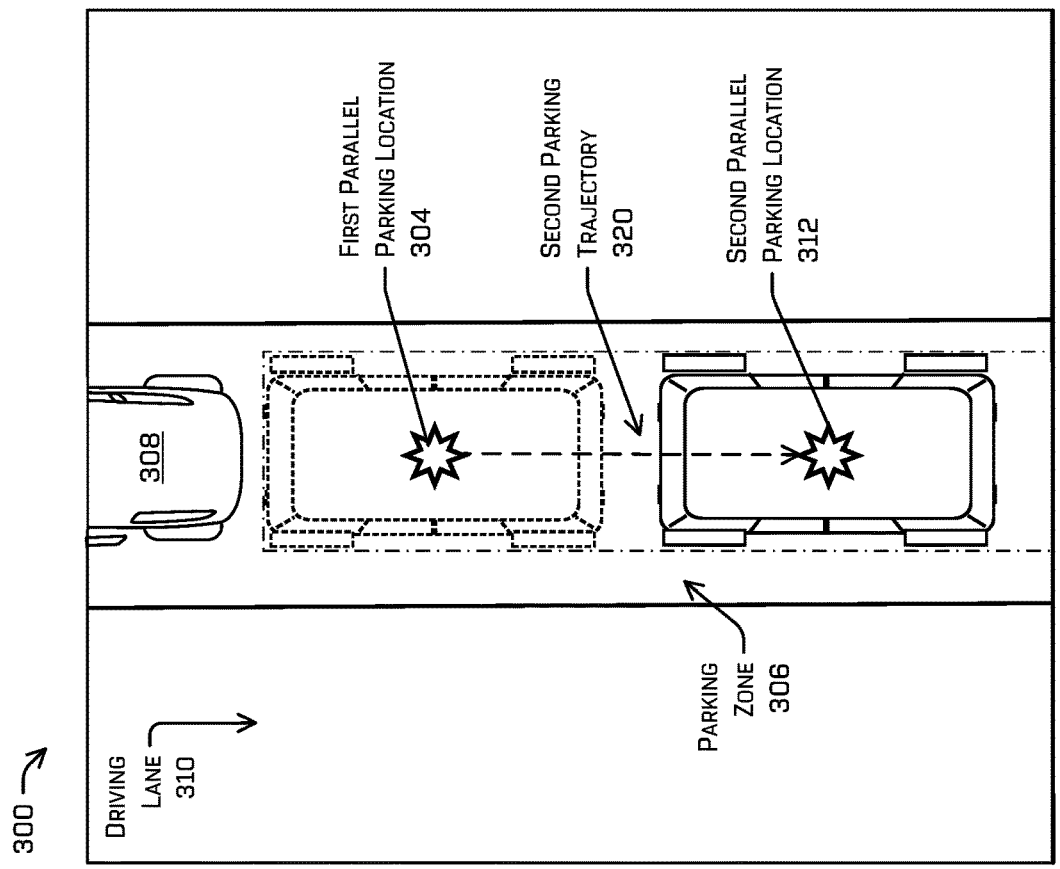
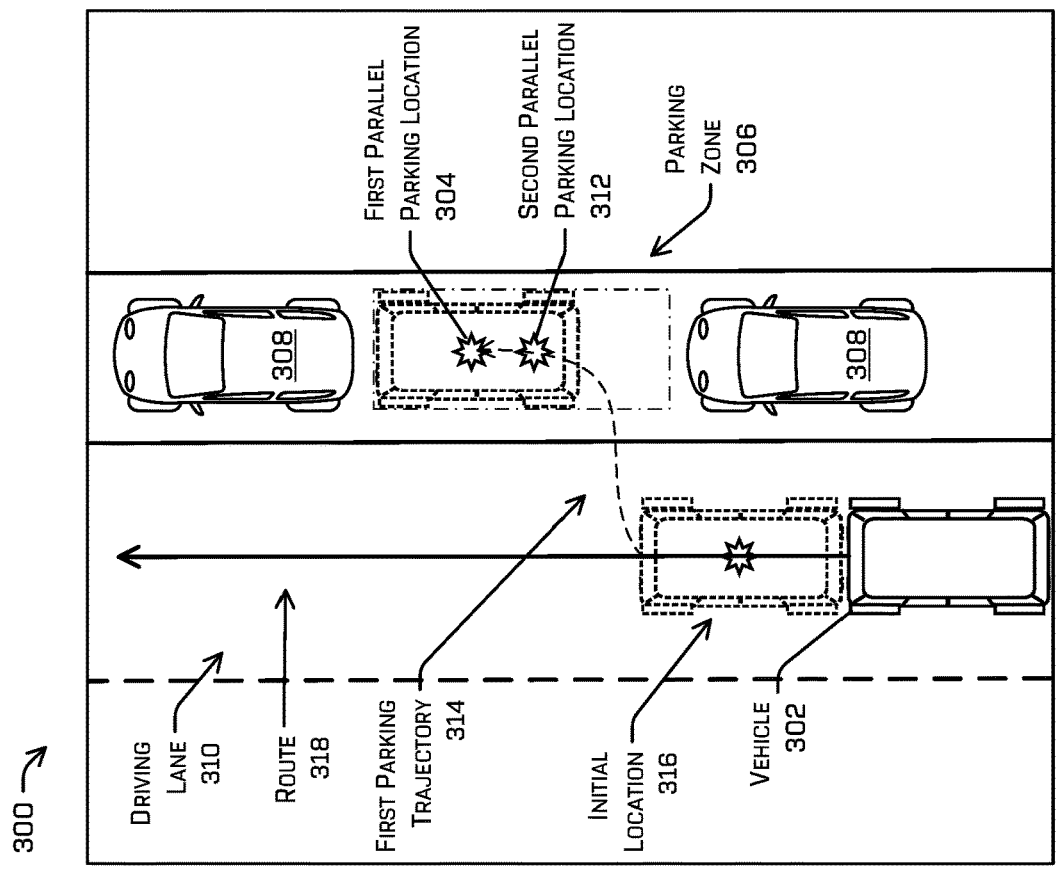
FIG. 3B
FIG. 3A

400

| | First Lateral Distance from Route Column 408 | Second Lateral Distance from Route Column 410 | Third Lateral Distance from Route Column 412 |
|---|---|---|---|
| Row 414 Heading Error +45 | 406, 402, 404 | | |
| Row 416 Heading Error 0 | | | |
| Row 418 Heading Error -45 | 406, 402, Distance (D), 404 | | |

FIG. 4

ACTION-BASED REFERENCE SYSTEMS FOR VEHICLE CONTROL

BACKGROUND

Autonomous vehicles are becoming increasingly common on roadways. An autonomous vehicle may include a computing system configured to navigate along designated routes from an initial location toward a destination according to a route-based reference frame, such as a Frenet reference frame. The route-based reference frame may reduce a computational complexity associated with autonomous vehicle control in the environment. However, the route-based reference system may limit autonomous vehicle operations to the designated routes associated with the route-based reference frame. Such limitations may restrict the autonomous vehicle from performing particular actions, such as parking, pulling over, reversing, or the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 2A depicts an example process for controlling the vehicle from a route associated with the route-based reference system to a parking location associated with the inertial-based reference system. FIG. 2B depicts an example process for controlling the vehicle from the parking location to the route.

FIGS. 3A and 3B illustrates an example environment in which a vehicle is controlled to a parking location based at least in part on an inertial-based reference system, in accordance with embodiments of the disclosure.

FIG. 4 illustrates a table of example paths a vehicle may travel to return to a route, in accordance with embodiments of the disclosure.

FIG. 8A is an illustration of a chart of distances along the route for the vehicle with a positive lateral offset to return to the route. FIG. 8B is an illustration of a chart of distances along the route for the vehicle with a negative lateral offset to return to the route.

FIG. 9A is an illustration of a chart of distances along the route for the vehicle with a large positive lateral offset to return to the route. FIG. 9B is an illustration of a chart of distances along the route for the vehicle with a large negative lateral offset to return to the route.

DETAILED DESCRIPTION

Figure 1:
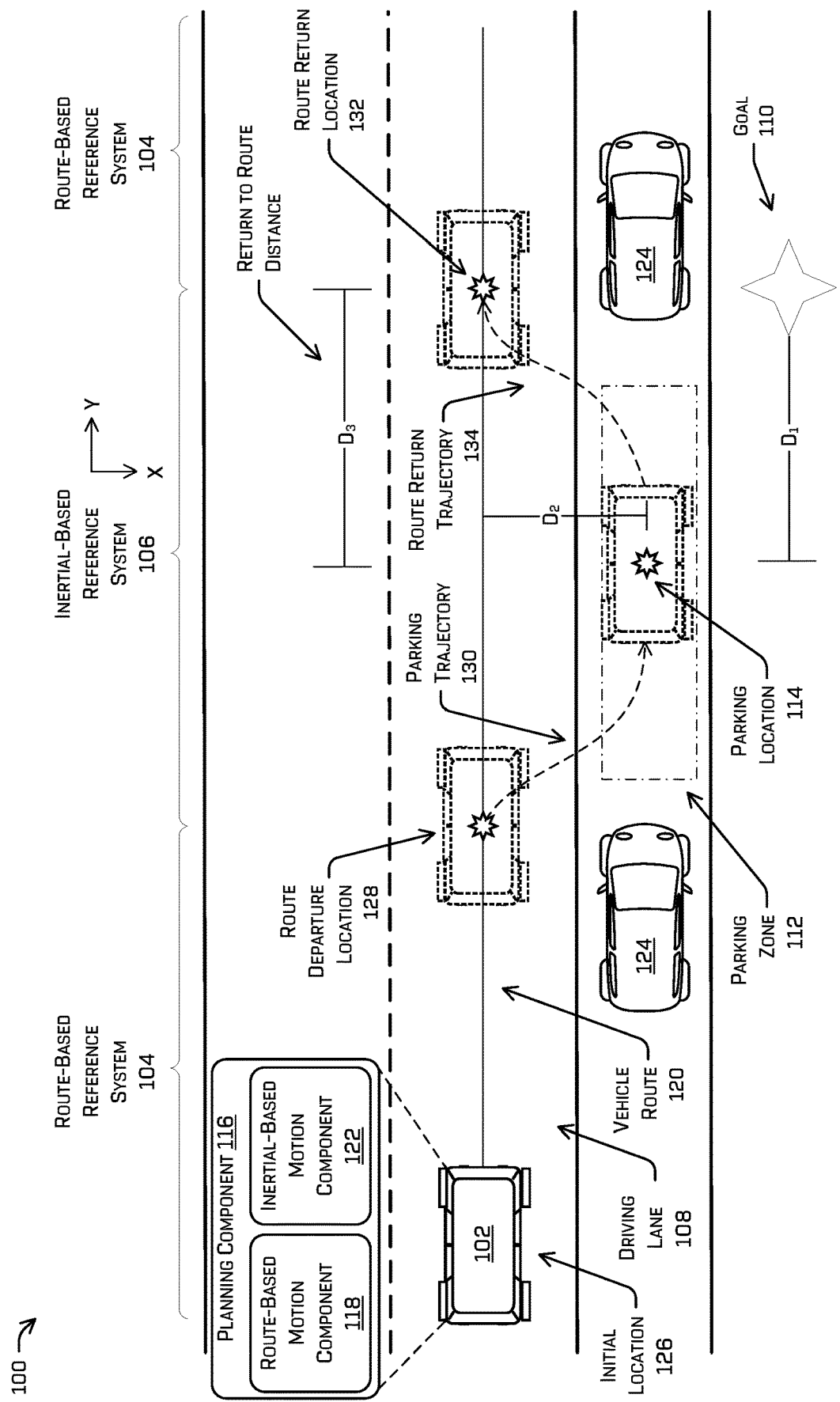
FIG. 1 is an illustration of an environment that includes a vehicle transitioning between a route-based reference system for vehicle control and an inertial-based reference system for vehicle control, in accordance with embodiments of the disclosure.

As discussed above, an autonomous vehicle may navigate along designated routes or between waypoints associated with the designated routes. A vehicle control system may control the vehicle along the designated routes based at least in part on a route-based reference system (e.g., Frenet frame, curvilinear coordinate frame, etc.). For example, the vehicle control system may receive a request from a user device to pick up the user at a location and provide transport to a destination location. The vehicle control system may determine one or more designated routes, such as based on a map of an environment, from a current location of the vehicle to the pick-up location. The vehicle control system may cause the vehicle to travel along the designated route(s) toward the pickup location based on the route-based reference system. In some circumstances, the autonomous vehicle may be required to park or pull the vehicle to the side of a road in order to pick the user up at the pickup location. In some instances, such as when the area of the pickup location is located a distance off a route or perpendicular to the route, the vehicle control system may transition to an alternative reference system for controlling the vehicle.

As such, this disclosure is directed to techniques for transitioning vehicle control between a route-based reference system and an inertial-based reference system. The route-based reference system may include a reference system for vehicle control on a route structure. As such, the vehicle computing system may control the vehicle according to the route-based reference system based on a determination to cause the vehicle to perform an action associated with the route structure (e.g., continue straight in a lane, lane change, etc.). The inertial-based reference system may include a reference system for vehicle control off the route structure (e.g., not associated with the designated route(s)). As such, the vehicle computing system may control the vehicle according to the inertial-based reference system based on a determination to cause the vehicle to perform an action associated with travel off a route (e.g., parking action, pull-over action, reversing action, etc.).

In various examples, the vehicle computing system may determine one or more route-based trajectories for the vehicle to travel toward a destination (e.g., a passenger pickup location, passenger drop-off location) based on the route-based reference system. In such examples, the route-based trajectories may be associated with one or more route-based actions, such as continuing straight on a route, executing a lane change left, lane change right, or the like. Additionally or in the alternative, the vehicle computing system may determine one or more off-route trajectories for the vehicle to travel toward the destination. In such examples, the off-route trajectories may be associated with one or more off-route actions, such as parking, pulling over, going in reverse, or the like.

In at least one example, the vehicle computing system may be configured to determine the route-based trajectories and the off-route trajectories in parallel. In such an example, the vehicle computing system may determine whether to control the vehicle according to the route-based reference system (route-based trajectories) or the inertial-based reference system (off-route trajectories) based on a cost associated with respective actions. The costs associated with the actions may be determined utilizing the techniques described in U.S. patent application Ser. No. 16/539,928, filed Aug. 13, 2019 and entitled "Cost-Based Path Determination," the entire contents of which are incorporated herein by reference. As an illustrative example, a vehicle computing system may determine, at a first time, that a first cost associated with continuing along a route is lower than a second cost associated with parking at a first parking location (e.g., stopping location) proximate a passenger pickup location. Based on the determination that the cost for continuing straight along a route is less than a cost associated with parking, the vehicle computing system may control the vehicle straight along the route. At a second time after the first time, such after the vehicle has traveled farther along the route toward the passenger pickup location, the vehicle computing system may determine that a cost associated with parking at a second parking location (e.g., closer to the passenger pickup location than the first parking location) is less than a cost associated with continuing along the route. Accordingly, the vehicle computing system may determine to control the vehicle toward the second parking location based on the off-route trajectories associated with the inertial-based reference system.

In various examples, the vehicle computing system may determine the off-route trajectories in parallel with the route-based trajectories based on a determination to operate the vehicle off the route structure. The determination to operate the vehicle off the route structure may be based on a determination to pull over to a side of a road, to park at a parking location, to perform a reversing action, or the like. For example, the vehicle computing system may detect an emergency vehicle approaching the vehicle and may determine to pull over to a side of the road to yield to the emergency vehicle. Based on a determination to yield, the vehicle computing system may determine the off-route trajectories. For another example, based on a determination that a vehicle is within a threshold distance of a destination (e.g., passenger pickup location), the vehicle computing system may search for and identify a parking location associated with picking up a passenger. Responsive to identifying the parking location off the route, the vehicle computing system may determine one or more off-route trajectories associated with navigating the vehicle to the parking location.

In various examples, the vehicle computing system may determine an off-route location associated with a potential movement off the route. The off-route location may include a parking location, a re-position location (e.g., reverse to reposition the vehicle), a pull-over location, or the like. The vehicle computing system may determine an initial location on the route associated with a departure from the route toward the off-route location. The initial location may include a current location or a future location of the vehicle traveling along the route based on the route-based reference system.

In various examples, the vehicle computing system may determine a reference trajectory from the initial location to the off-route location. The reference trajectory may be determined based on a cubic spline curve, a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., single reference trajectory).

In various examples, the vehicle computing system may generate a corridor around the reference trajectory. In some examples, the corridor may include a drivable surface (or region of drivable surfaces) extending a distance on either side from the reference trajectory. In various examples, the vehicle computing system may adjust size and/or shape of the corridor based on one or more detected objects (e.g., static or dynamic objects) in an area defined by the distance extending on either side from the reference trajectory. In such examples, the corridor may include the area defined by the distance extending on either side of the reference trajectory from the initial location to the off-route location minus one or more areas associated with the detected object(s) (e.g., the area extending on either side with a section associated with the object removed). In various examples, the vehicle computing system may fuse the detected object(s) into the drivable surface, such as utilizing the techniques described in U.S. patent application Ser. No. 15/982,694, filed May 17, 2018 and entitled "Drive Envelope Determination," the entire contents of which are incorporated herein by reference.

In various examples, the off-route trajectory may be determined based on the reference trajectory and the corridor. In some examples, the vehicle computing system may apply an optimization algorithm to the reference trajectory and the corridor to determine the off-route trajectory. In at least one example, a differential dynamic programming algorithm may be used to determine the off-route trajectory. In such an example, the vehicle computing system may determine a dynamically feasible trajectory that is optimized based on costs and constraints associated with off-route operation. In other examples, other optimization algorithms may be used to determine dynamically feasible off-route trajectories.

In various examples, based on a determination that the off-route trajectory and action associated therewith has a lower cost than continuing along a route, the vehicle computing system may determine to switch to an inertial-based reference system for controlling the vehicle. The inertial-based reference system may include a body-centric reference system, such as that based on an X-Y-Z reference from the vehicle. For example, the vehicle computing system may detect an object in the environment and may determine a location associated with the object based on a lateral distance (X) and distance ahead of or behind (Y) the vehicle. For another example, (X) may represent a longitudinal distance and (Y) may represent a lateral distance). In various examples, the vehicle computing system may control the vehicle based on the off-route trajectory to the off-route location, such as that associated with a pickup location. For example, the pickup location may include a location at which the vehicle picks up a passenger to transport the passenger to a destination. Based on a determination that the passenger has entered the vehicle and/or is securely situated in the vehicle (e.g., with a seatbelt fastened), the vehicle computing system may determine to initiate movement toward the destination.

In various examples, the vehicle computing system may determine a route (one or more routes) associated with the route structure from the pickup location to the destination (e.g., drop-off location). In some examples, the route may include a route closest to the pickup location. In various examples, the vehicle computing system may determine a route return location associated with the vehicle transitioning from an inertial-based reference system to the route-based reference system. In various examples, the route return location may be based on a lateral distance from the off-route location (e.g., pickup location) and a heading error associated with the vehicle. The heading error may include an angular distance between a direction associated with the route and a direction in which the vehicle is facing at the off-route location.

In some examples, the vehicle computing system may be configured to operate the vehicle in two directions (e.g., bi-directional). In some examples, the heading error may be based on a smallest angular difference between the direction associated with the route and a heading associated with each of the two directions of travel. In such examples, the vehicle computing system may determine a direction of the two directions in which to control the vehicle based in part on the smallest angular difference between the vehicle direction and the direction associated with the route.

In some examples, the heading error may be based on an angular difference between a side of the vehicle located closest (e.g., a shortest distance) to a route. In such examples, the vehicle computing system may determine a first distance from the route to a first side of the vehicle and a second distance from the route to a second side of the vehicle. The vehicle computing system may determine the heading error based on a direction associated with the lesser of the first distance or the second distance. For example, the vehicle may be parked in a diagonal parking zone oriented 30 degrees off a direction associated with a route. The vehicle computing system may determine to control the vehicle straight out of the parking zone and onto the route in lieu of first reversing the vehicle and then proceeding forward toward the route. Accordingly, the vehicle computing system may determine that the heading error associated with pulling straight out of the parking zone is 150 degrees. Though this is merely an illustrative example, and is not intended to be so limiting.

In various examples, the vehicle computing system may apply the heading error and the lateral distance from the vehicle to the route to a mathematical function to determine the route return location. In at least one example, the function may include a sigmoid function. In other examples, one or more other mathematical functions may be used to determine the route return location, such as those representative of smooth and continuous function(s) with maximum and minimum values.

In various examples, the vehicle computing system may be configured to determine a route return trajectory based on an initial location of the vehicle (e.g., pickup location, parking location, etc.) and the route return location. In some examples, the route return trajectory may be determined as described above, such as by performing a trajectory optimization based on a reference trajectory and a corridor. The route return trajectory may be associated with the inertial-based reference system. In such examples, the vehicle computing system may control the vehicle along the route return trajectory based at least in part on the inertial based reference system. In various examples, the vehicle computing system may periodically (e.g., every 0.1 seconds, 0.2 seconds, etc.) update the route return trajectory while controlling the vehicle from the initial location to the route return location.

In various examples, similar to that described above with transitioning from the route-based reference system to the off-route reference system, the vehicle computing system may determine one or more route-based trajectories associated with traveling on the route concurrently the route return trajectory(ies). In some examples, the vehicle computing system may determine the route-based trajectories based on a determination that the vehicle is within a threshold distance or time of the route and/or the route return location (e.g., within 2 meters, 3 feet, within 0.1 seconds, 1 second, etc.). In such examples, the vehicle computing system may determine a single type of trajectory (e.g., off-route) until determining that the vehicle is within the threshold distance or time from the route, at which point the vehicle computing system may determine both the off-route and the route-based trajectories in parallel.

In some examples, the vehicle computing system may determine the route-based trajectories based on a determination to initiate movement from the initial location. In such examples, the vehicle computing system may determine the off-route and route-based trajectories concurrently throughout the movement from the off-route location to the route. In various examples, the vehicle computing system may determine a cost associated with the route return trajectory and the route-based trajectory. Based on a determination that a route-based trajectory has an associated cost that is less than a cost associated with a route return trajectory, the vehicle computing system may determine to transition from the inertial based reference system to the route-based reference system. Responsive to the determination to transition to the route-based reference system, the vehicle computing system may control the vehicle based at least in part on route-based trajectories. In various examples, the vehicle computing system may rejoin the route at or around the route return location and may control the vehicle based at least in part on the route-based reference system.

The techniques described herein may improve the functioning of a vehicle computing system in a number of ways. For example, the vehicle computing system may be configured to operate according to a route-based reference frame with one or more constraints, thereby reducing a computational load and increasing the computational speed associated with controlling the vehicle according to the route structure. In various examples, the vehicle computing system may determine one or more trajectories associated with an inertial-based reference system in parallel with trajectories associated with the route-based reference system, to enable a seamless transition from operating on the route and off a route, such as when parking, pulling over, going in reverse, or the like. The seamless transition may result in an improved operation of the vehicle in an environment, such as by enabling the vehicle to transition to and from a route structure without slowing down, stopping, or otherwise delaying forward motion.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system using machine vision (e.g., in a system using image data). Additionally, the techniques described herein may be used with real data (e.g., captured using sensor(s)), simulated data (e.g., generated by a simulator), or any combination of the two.

FIG. 1 is an illustration of an environment 100 that includes a vehicle 102 transitioning between a route-based reference system 104 for vehicle control and an inertial-based reference system 106 for vehicle control, in accordance with embodiments of the disclosure. For example, the vehicle 102 may be navigating along a driving lane 108 and towards a goal 110 (e.g., destination, pick-up location, etc.). While navigating, the vehicle 102 may identify a parking zone 112. In some instances, the vehicle 102 may identify the parking zone 112 using map data that is available to the vehicle 102, where the map data indicates at least one of the parking zone 112 or the parking location 114 associated with the parking zone. Additionally or in the alternative, in some instances, the vehicle 102 may identify the parking zone 112 and/or the parking location 114 using sensor data generated by one or more sensors of the vehicle 102. The sensor data may include data captured by cameras, lidar, radar, sonar, time-of-flight sensors, and/or other sensors associated with the vehicle. In at least one example, the vehicle 102 may determine the parking zone 112 and/or the parking location 114 utilizing the techniques described in U.S. patent application Ser. No. 16/587,409, filed Sep. 30, 2019 and entitled "Parking Zone Detection for Vehicles" and U.S. patent application Ser. No. 15/936,148, filed Mar. 26, 2018 and entitled "Parking Assist Using Light and Sound, the entire contents of both applications are incorporated herein by reference.

In various examples, the vehicle 102 may analyze the parking zone 112 to identify the parking location 114. In the illustrative example, the parking location 114 may include a location associated with a center of the vehicle 102 at a stopped position in the parking zone 112. Thought this is merely an illustration and is not intended to be so limiting. In some examples, the parking location may include a length and a width of the vehicle 102 and/or a safety margin around an outer perimeter of the vehicle 102.

In various examples, a planning component 116 of the vehicle 102 (of a vehicle computing system) may determine one or more route-based trajectories while traveling on the route 120 in the driving lane 108 toward the goal 110. The route 120 may include a general path in which the vehicle 102 may travel toward the goal 110, such as in the driving lane 108, switching lanes, etc. For an illustrative example, the goal 110 may include a location associated with a pickup of a passenger, such as a passenger that contacts the vehicle 102 for a ride from the pickup location to another location. The route-based trajectories may be generated by a route-based motion component 118 of the planning component 116. In various examples, the route-based motion component 118 may generate the route-based trajectories based on the route-based reference system. The route-based reference system may reference different locations in the environment based on the route 120. For example, the route-based motion component 118 may determine that a direction and velocity is associated with continuing straight along the route 120. In various examples, the environment 100 may include a plurality of routes 120 associated with one or more driving lanes, such as driving lane 108. The plurality of routes 120 may be included in the one or more maps, such as those used to determine the parking zone 112 and/or parking location 114. In various examples, the route-based trajectories generated by the route-based motion component 118 may include continuing straight in a driving lane 108, changing lanes left, and changing lanes right, as well as associated velocities.

In various examples, the route-based motion component 118 may include one or more constraints associated with the route-based trajectories. In some examples, a constraint may include maintaining a location of the vehicle within a threshold distance of the route 120. In some examples, the constraint may include monotonically increasing a location along the route 120. In such examples, the route-based motion component 118 may be disabled from generating a trajectory associated with the vehicle traveling in reverse on a route 120. For example, the route-based motion component 118 may generate a first trajectory to cause the vehicle to move forward and a second trajectory to cause the vehicle to stop. However, the route-based motion component 118 may be constrained from generating a third trajectory to cause the vehicle to travel in reverse. Accordingly, the vehicle, operating in the route-based reference system 104 may either stop or move forward along the route 120.

In various examples, the planning component 116 may include an inertial-based motion component 122 configured to generate one or more off-route trajectories. In various examples, the off-route trajectories may include trajectories associated with the vehicle 102 traveling off the route 120 (e.g., not associated with the route 120 and/or a route structure). In various examples, the off-route trajectories may include trajectories associated with actions that are not permitted by the constraint(s) placed on the route-based reference system, such as a reversing action, a parking action, a pull-over action, and/or any other action that would require the vehicle to move in a direction more than a threshold distance from a route and/or move forward but not increase a distance (or a sufficient distance) along the route 120.

The off-route trajectories may include those associated with an inertial-based reference system 106. The inertial-based reference system may include a body-centric reference frame associated with the vehicle 102. For example, the inertial-based reference system may include a reference to the environment in an inertial frame (e.g., cartesian coordinate frame, X-Y-Z, etc.) based on the vehicle 102 location and/or position. For example, the vehicle 102 when operating in the inertial-based reference system 106 may detect an object 124, such as based on the sensor data. The vehicle 102 may determine a location of the object 124 relative to the vehicle in the inertial coordinate frame.

In various examples, the route-based motion component 118 and the inertial-based motion component 122 of the planning component 116 may be configured to determine route-based trajectories and off-route trajectories, respectively, in parallel. In various examples, the inertial-based motion component 122 may initiate off-route trajectory determinations in parallel with the route-based trajectory determinations of the route-based motion component 118 based on a determination that one or more conditions for off-route travel are satisfied. The conditions may include a determination that the vehicle 102 is within a first threshold distance (illustrated as $D_1$) from the goal 110 and/or that the vehicle 102 is within a threshold distance from the parking zone 112 and/or parking location 114, that a parking zone 112 and/or parking location 114 is identified, that the parking zone 112 and/or parking location 114 is within a second threshold distance of the goal 110, that the parking zone and/or parking location 114 is unoccupied (e.g., clear of objects 124, no objects 124 present in the parking zone 112 and/or parking location 114), and/or that a length and width of the parking zone 112 and/or parking location 114 is visible to the vehicle 102 (e.g., the parking zone 112 and/or parking location 114 is not occluded).

Additionally or in the alternative, the inertial-based motion component 122 may initiate off-route trajectory determinations in parallel with the route-based trajectory determinations of the route-based motion component 118 based on a determination that an emergency vehicle is detected in the environment 100 and is relevant to the vehicle 102. In some examples, the emergency vehicle may be relevant to the vehicle 102 based on a determination that the emergency vehicle is emitting at least one of a flashing light or a siren. In some examples, the emergency vehicle may be relevant to the vehicle 102 based on a determination that an emergency vehicle trajectory is associated with the driving lane 108, the route 120, a direction of travel associated with the vehicle 102, or the like. In some examples, the emergency vehicle may be relevant to the vehicle 102 based on a determination, by the planning component 116, to yield thereto, such as that based on one or more of the factors described above (e.g., emergency vehicle trajectory, siren, lights, etc.). Based on a determination that the emergency vehicle is relevant to the vehicle 102, the inertial-based motion component 122 may determine one or more off-route trajectories, such as that associated with a pull-over action to yield to the emergency vehicle.

In various examples, the route-based motion component 118 may determine a first cost associated with a route-based trajectory and the inertial-based motion component 122 may determine a second cost associated with an off-route trajectory. The first cost and the second cost may be based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like, such as those described in the U.S. Patent Application incorporated herein above.

The planning component 116 may compare the first cost and the second cost and may determine a lowest cost action. The planning component 116 may control the vehicle 102 based at least in part on the lowest cost action (e.g., action with the associated lowest cost trajectory). For example, the vehicle 102 at a first time, may determine an initial location 126 associated with the vehicle 102. The route-based motion component 118 may determine a first route-based trajectory associated with the vehicle 102 continuing straight along the route 120 from the initial location 126. The inertial-based motion component 122 may determine a first off-route trajectory associated with the vehicle 102 departing the route at the initial location 126 and proceeding toward the parking location 114. The planning component 116 may receive a first cost associated with the first route-based trajectory and a second cost associated with the first off-route trajectory. The planning component 116 may determine to control the vehicle according to the first route-based trajectory based on a determination that the first cost is less than the second cost.

In various examples, the route-based motion component 118 and the inertial-based motion component 122 may periodically determine respective trajectories (e.g., every 0.1 second, 0.2 seconds, 1 second, etc.). In such examples, the planning component 116 may periodically determine the lowest cost action and control the vehicle according to the lowest cost action. Continuing the example from above, at a second time, the vehicle 102 may be at a second location 128 (illustrated as route departure location 128). The route-based motion component 118 may determine a second route-based trajectory associated with the vehicle 102 continuing straight along the route 120 from the second location 128. The inertial-based motion component 122 may determine a second off-route trajectory associated with the vehicle 102 departing the route at the second location 128 and proceeding toward the parking location 114. The planning component 116 may receive a third cost associated with the second route-based trajectory and a fourth cost associated with the second off-route trajectory. The planning component 116 may determine to control the vehicle according to the second off-route trajectory (e.g., parking trajectory 130) based on a determination that the fourth cost is less than the third cost.

In some examples, the planning component 116 may determine to control the vehicle 102 based on an off-route trajectory based on a determination that the route-based motion component 116 is unable to generate a trajectory to a particular location, such as parking location 114. In some examples, the route-based motion component 116 may be unable to generate the trajectory to the particular location based on one or more constraints associated with the route-based motion component 118, such as a constraint to increase a distance along a route 120, maintain a threshold distance from the route 120, and the like. For example, the planning component 116 may determine that the route-based motion component 118 may not be configured to generate a trajectory to the parking location 114 due in part to a distance from the route 120. Based on the determination, the planning component 116 may receive the parking trajectory 130 from the inertial-based motion component 122 and may control the vehicle based on the parking trajectory 130.

In various examples, the inertial-based motion component 122 may determine the parking trajectory 130 from the route departure location 128 to the parking location 114. In some examples, the parking trajectory 130 may be determined based on a reference trajectory from the route departure location 128 to the parking location 114. The reference trajectory may represent a reference curve (e.g., reference line) from the route departure location 128 to the parking location 114. The reference trajectory may be determined based on a cubic spline curve (e.g., cubic spline connector), a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., single reference trajectory). In various examples, the reference trajectory may be modified based on a velocity profile determined based on an initial velocity associated with the route departure location 128 and the final velocity associated with the parking location 114.

In various examples, the inertial-based motion component 122 may determine a corridor extending a distance one either side of the reference trajectory. In various examples, the corridor may represent an area of a drivable surface over which the vehicle 102 may travel from the route departure location 128 to the parking location 114. In various examples, the inertial-based motion component 122 may adjust a size of the corridor (e.g., area associated therewith) based on a detected object 124 located in the corridor. In such an example, the inertial-based motion component 122 may identify detected objects 124 and may determine an area associated with the detected objects 124. The inertial-based motion component 122 may remove the area associated with the detected objects 124 from the corridor. In such an example, the inertial-based motion component 122 may be restricted from generating an off-route trajectory, such as the parking trajectory 130, that may conflict with one or more objects 124.

In various examples, the inertial-based motion component 122 may determine an initial trajectory from the route departure location 128 to the parking location 114. The initial trajectory may represent an initial estimation of a trajectory from the route departure location 128 to the parking location 114. In some examples, the initial trajectory may be a same trajectory as the reference trajectory. In some examples, the initial trajectory may include a trajectory that was generated at a previous time (e.g., previous time associated with periodic trajectory generation).

In various examples, the inertial-based motion component 122 may determine the parking trajectory 130 based on the reference trajectory, the corridor, and/or the initial trajectory. In some examples, the inertial-based motion component 122 may apply an optimization algorithm to the reference trajectory, the corridor, and/or the initial trajectory to determine the parking trajectory 130. In at least one example, a differential dynamic programming algorithm may be used to determine the parking trajectory 130. In such an example, the inertial-based motion component 122 may determine a dynamically feasible trajectory that is optimized based on costs and constraints associated with operation according to the inertial-based reference system 106. In other examples, other optimization algorithms may be used to determine a dynamically feasible parking trajectory 130.

In various examples, the inertial-based motion component 122 may determine that the parking trajectory 130 satisfies one or more conditions prior to providing the parking trajectory 130 to the planning component 116 for vehicle control. The condition(s) may include determining that a cost associated with the parking trajectory is below a threshold cost, determining that the parking trajectory does not conflict with one or more static or dynamic objects, determining that the parking location (e.g., final state associated with the parking trajectory 130) is within a spatial threshold of the final state associated with the reference trajectory, the parking trajectory 130 includes vehicle kinematics for which the vehicle 102 is configured (e.g., does not exceed a turning radius of the vehicle 102), and the like. Based on a determination that the condition(s) are satisfied, the inertial-based motion component 122 may provide the parking trajectory 130 to the planning component 116.

In various examples, the planning component 116 may control the vehicle to the parking location 114 based on the parking trajectory 130 associated with the inertial-based reference system 106. The vehicle 102 may maintain a stopped position at the parking location 114, such as to drop off a passenger, pick up a passenger, await a call from a passenger, recharge a battery (e.g., goal 110 or parking location 114 associated with a battery charging station). In various examples, the planning component 116 may determine to initiate movement from the parking location 114. For example, a passenger may enter the vehicle 102 and may enter a destination associated with a trip from the parking location 114 to the destination. Based upon a determination that the passenger is secure in the vehicle 102, the planning component 116 may determine to initiate movement.

In various examples, the inertial-based motion component 122 may determine a route return location 132. The route return location 132 may represent an estimated location associated with the vehicle 102 rejoining the route 120 and/or the route structure (e.g., a different route). In various examples, the route return location 132 may represent an estimated location at which the planning component 116 may transition from the inertial-based reference system to the route-based reference system 104. In such examples, the planning component 116 may improve the functioning of the vehicle computing device by transitioning to a reference frame (route-based) associated with a reduced computational complexity.

In various examples, the route return location 132 may be determined based on a planned direction of travel of the vehicle 102 along the route 120. For example, the vehicle 102 may determine to travel a first direction on a first route 120 associated with a first driving lane 108. The vehicle 102 may determine the route return location 132 associated with merging onto the first route 120. For another example, the vehicle 102 may determine to travel a second direction on a second route 120 associated with a second driving lane 108. The vehicle 102 may determine the route return location 132 associated with executing a U-turn to join the second route 120.

In some examples, the route return location 132 may represent a location at which the planning component 116 may transition from an inertial based reference system 106 to the route-based reference system 104. In some examples, the route return location 132 may represent a point at which the planning component 116 may transition from controlling the vehicle according to off-route trajectories, such as a route return trajectory 134 generated by the inertial-based motion component 122, to a route-based trajectory generated by the route-based motion component 118.

In various examples, the route return location 132 may be determined based on a distance ($D_2$) from the vehicle 102 to the route 120. In various examples, the distance ($D_2$) may represent a lateral distance from a center or other location of the vehicle 102 to the route 120. In various examples, the route return location 132 may be determined based on a heading associated with the vehicle 102. In some examples, the route return location 132 may be determined based on an angular difference between the heading of the vehicle and the direction associated with the route 120. The angular difference between the heading of the vehicle and the direction associated with the route may be referred to herein as a heading error associated with the vehicle.

In some examples, the inertial-based motion component 122 may determine the route return location 132 by applying the lateral distance ($D_2$) and the heading error to a function. In at least one example, the function may include a sigmoid function such as that represented by:

$$l(\lambda_{min}, e) = \lambda_{min} + \frac{l_{max} - \lambda_{min}}{1 + \exp(-k(|e| - y_{thr}))}, \quad (1)$$

where $|e|$ denotes absolute value of e, $\lambda_{min}$ denotes the minimum distance along the route 120 to the route return location 132 and is a function of the heading error ($e_\theta$) represented by:

$$\Lambda_{min}(e_\theta) = l_{min} + r_{nom} \sin|e_\theta|, \quad (2)$$

where $r_{nom}$ represents a nominal turning radius associated with the vehicle 102. The nominal turning radius may include a minimum turning radius multiplied by a factor that is greater than one (e.g., 1.1, 1.2, etc.). In various examples, the nominal turning radius may be determined based at least in part on the following equation:

$$r_{nom} \geq \frac{L}{\tan\phi_{max}}, \qquad (3)$$

where L represents a distance between a front axle and a rear axle of the vehicle 102 and $\phi_{max}$ represents a maximum steering angle of the vehicle 102. In such an example, the vehicle 102 may include a two-wheel steering vehicle. In some examples, the vehicle 102 may include a four-wheel steering vehicle. In such examples, the nominal turning radius may be determined based at least in part on:

$$r_{nom} \geq r_{min}, \qquad (4)$$

where $r_{min}$ is the minimum turning radius of the vehicle 102.

In some examples, e may include the lateral distance ($D_2$) with some adjustments based on the heading angle error and limitations from vehicle 102 kinematics, represented by:

$$e(y, e_\theta) = y + r_{nom}(1 - \cos e_\theta)\mathrm{sgn}(e_\theta), \qquad (5)$$

where $\mathrm{sgn}(e_\theta)$ is the sign of $e_\theta$.

Equations (1), (2), and (5) may include variables, $l_{min}$, representative of a minimum distance to put the route return location 132 along the driving lane 108 (e.g., along the route 120) and $l_{max}$, representative of a maximum distance to put the route return location 132 along the driving lane 108. In some examples, k may represent a steepness parameter of the sigmoid function represented in equation (1) and $y_{thr}$ may represent a threshold lateral distance (e.g., maximum distance ($D_2$)) to consider. In various examples, the threshold lateral distance may be determined based on a point at which the sigmoid function represented in equation (1) gets smaller.

In various examples, the route return location 132 may be located a return to route distance ($D_3$) along the route 120 from the parking location 114 between a minimum distance ($l_{min}$) and a maximum distance ($l_{max}$).

In various examples, based on a determination of the route return location 132, the inertial-based motion component 122 may generate the route return trajectory 134 based on the inertial-based reference system. Similar to the parking trajectory described above, the inertial-based motion component 122 may determine a reference trajectory, a corridor, and/or an initial trajectory associated with vehicle 102 travel between the parking location 114 and the route return location 132. The inertial-based motion component 122 may optimize the reference trajectory, a corridor, and/or an initial trajectory to determine the route return trajectory 134. In various examples, the planning component 116 may control the vehicle according to the route return trajectory 134 to rejoin the route 120 and travel to the destination.

In various examples, the inertial-based motion component 122 may periodically determine route return trajectories 134 during the movement of the vehicle from the parking location 114 to the route return location 132. In such examples, the inertial-based motion component 122 may periodically update the route return trajectory 134. In various examples, the route-based motion component 118 may additionally generate one or more route-based trajectories in parallel with the inertial-based motion component 122 generation of one or more route return trajectories 134. In some examples, the planning component 116 may determine costs associated with the route return trajectories 134 and the route-based trajectories. In some examples, based on a determination that a cost associated with a route-based trajectory is less than a cost associated with the route return trajectory 134, the planning component 116 may determine to control the vehicle 102 according to the route-based trajectory. Accordingly, the planning component 116 may rejoin the route 120 and transition to the route-based reference system 104 for navigating the vehicle 102 to the destination.

In various examples, the planning component 116 may determine to transition to the route-based reference system 104 based on a determination that one or more conditions for rejoining the route 120 are satisfied. The conditions for rejoining the route may include that the vehicle 102 is within a threshold distance of the route 120, within a threshold distance of the route return location 132, and/or that a heading error associated with the vehicle 102 is less than a threshold heading error (e.g., less than 10 degrees, less than 15 degrees, etc.). The planning component 116 may control the vehicle 102 to the destination or within a threshold distance of the destination based on the route-based reference system 104.

FIGS. 2A, 2B, and 11-13 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

Figure 2A:
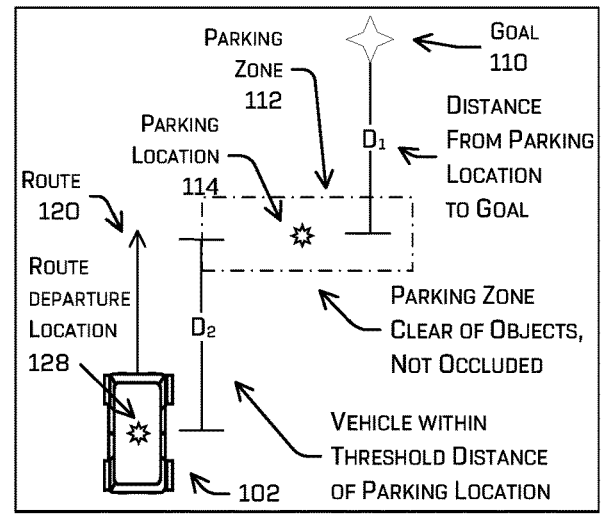
FIGS. 2A and 2B depict an example process for transitioning vehicle control between a route-based reference system and an inertial-based reference system, in accordance with embodiments of the disclosure.
Figure 2A:
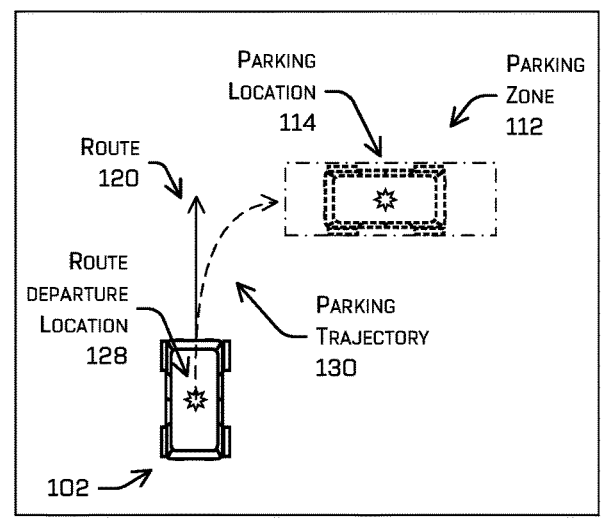
Figure 2A:
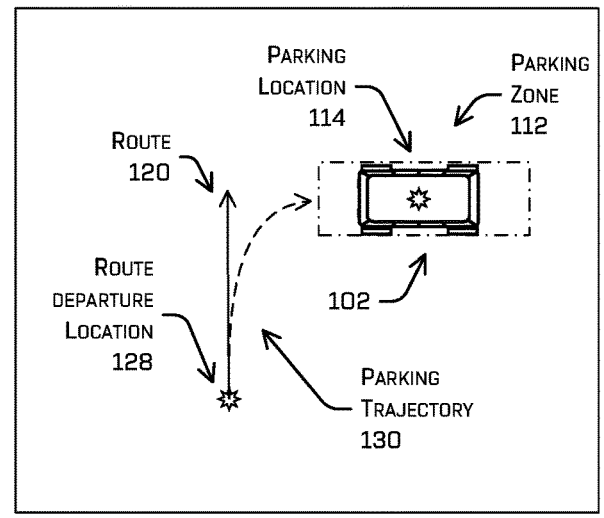
Figure 2B:
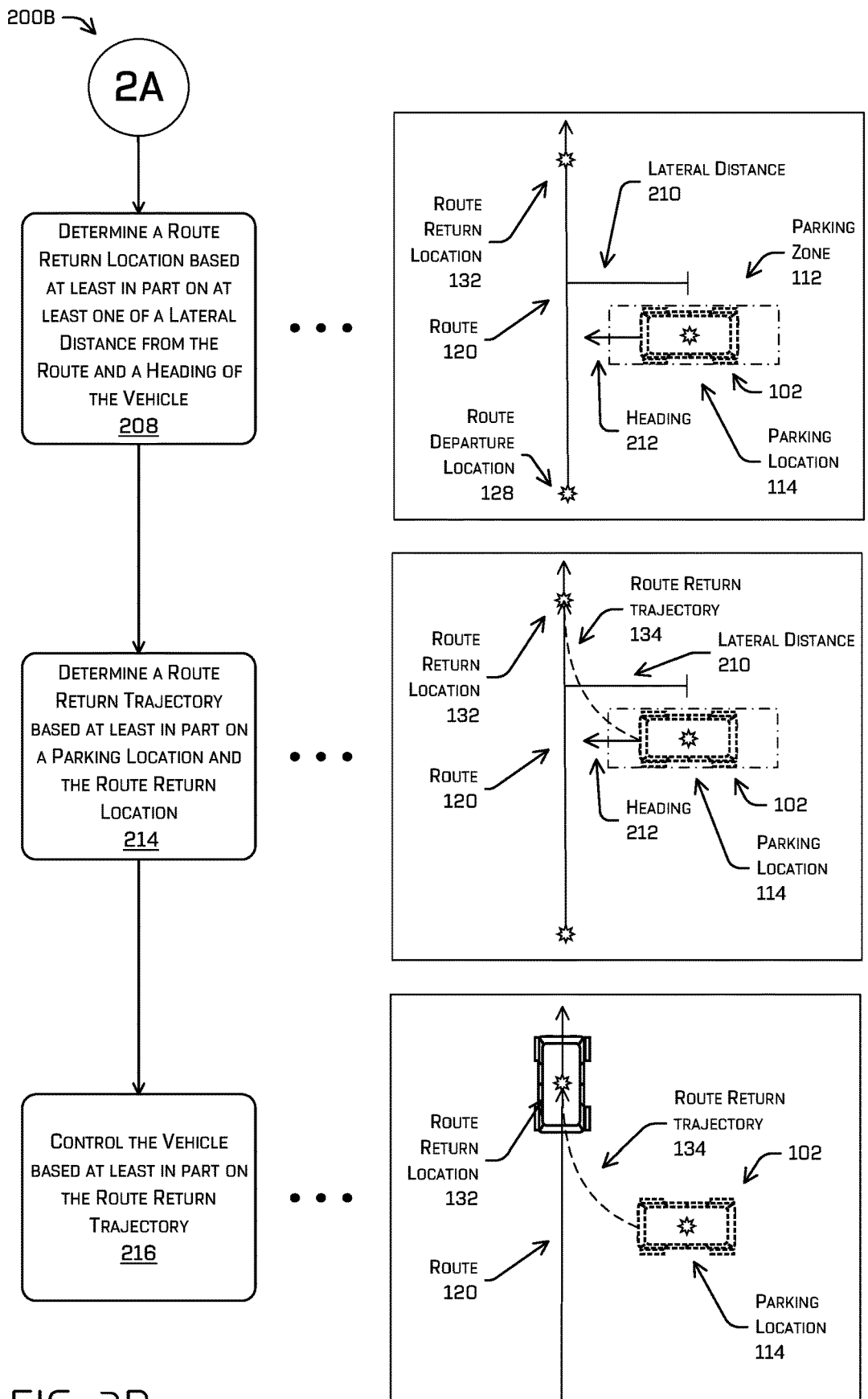

FIGS. 2A and 2B depict an example process for transitioning vehicle control between a route-based reference system and an inertial-based reference system, in accordance with embodiments of the disclosure. FIG. 2A depicts an example process 200A for controlling the vehicle 102 from a route 120 associated with a route-based reference system, such as route-based reference system 104, to a parking location 114 associated with an inertial-based reference system, such as inertial-based reference system 106. In various examples, the determination to control the vehicle based on the inertial-based reference system may be based at least in part on determining that a parking zone 112 and/or parking location 114 is located off the route 120 associated with the route-based reference system.

At operation 202, the process may include determining that one or more preconditions for parking are satisfied. In some examples, the preconditions for parking may include determining that a parking zone 112 and/or parking location 114 is identified, that the parking zone 112 and/or parking location 114 is within a first threshold distance of the goal 110 (illustrated as $D_2$), that the vehicle is within a second threshold (illustrated as $D_2$) from the parking location 114, the parking zone 112, and/or the goal 110, that the parking zone 112 and/or parking location 114 is unoccupied (e.g., no objects, such as objects 124, are present in the parking zone 112 and/or parking location 114), and/or that a length and width of the parking zone 112 and/or parking location 114 is visible to the vehicle 102 (e.g., the parking zone 112 and/or parking location 114 is not occluded).

Though described as a parking location, the parking zone 112 and/or parking location 114 may additionally or alternatively represent a pull-over location associated with the vehicle 102 executing a pull-over action. For example, a passenger of the vehicle 102 may request an immediate drop-off while the vehicle 102 is operating in an environment. A vehicle computing system may determine the parking zone 112 and/or parking location 114 associated with the pull-over action to let the passenger out of the vehicle 102. For another example, the vehicle computing system may determine to yield to an emergency vehicle, such as by executing a pull-over action. The vehicle computing system may thus determine the parking zone 112 and/or parking location 114 associated with the yield.

At operation 204, the process may include determining a parking trajectory from an initial location 128 (e.g., route departure location 128) to a parking location 114. As described above, the parking trajectory 130 may be determined based on a reference trajectory, a corridor, and/or an initial trajectory. The reference trajectory may represent a reference curve (e.g., reference line) from the initial location 128 to the parking location 114. The reference trajectory may be determined based on a cubic spline connector, a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., single reference trajectory).

In various examples, the vehicle computing system may determine a corridor extending a distance one either side of the reference trajectory. In various examples, the corridor may represent an area of a drivable surface over which the vehicle 102 may travel from the initial location 128 to the parking location 114. In various examples, the vehicle computing system may adjust a size of the corridor (e.g., area associated therewith) based on a detected object (e.g., static or dynamic object) located in the corridor. In such an example, the vehicle computing system may identify detected object and may determine an area associated with the detected object. The vehicle computing system may remove the area associated with the detected object from the corridor. In such an example, the vehicle computing system may be restricted from generating an off-route trajectory, such as the parking trajectory 130, that may conflict with one or more objects.

In various examples, the vehicle computing system may determine an initial trajectory from the initial location 128 to the parking location 114. The initial trajectory may represent an initial estimation of a trajectory from the initial location 128 to the parking location 114. In some examples, the initial trajectory may be a same trajectory as the reference trajectory. In some examples, the initial trajectory may include a trajectory that was generated at a previous time (e.g., previous time associated with periodic trajectory generation). In such examples, the initial trajectory may represent a parking trajectory 130 generated at a previous time prior to a current time, the previous time associated with periodic trajectory determinations (e.g., every 0.1 second, every 0.3 seconds, etc.).

In some examples, the vehicle computing system may apply an optimization algorithm to the reference trajectory, the corridor, and/or the initial trajectory to determine the parking trajectory 130. In at least one example, a differential dynamic programming algorithm may be used to determine the parking trajectory 130. In such an example, the vehicle computing system may determine a dynamically feasible trajectory that is optimized based on costs and constraints associated with operation according to the inertial-based reference system. In other examples, other optimization algorithms may be used to determine a dynamically feasible parking trajectory 130.

At operation 206, the process may include controlling the vehicle 102 to the parking location 114 based at least in part on the parking trajectory 130. In various examples, the vehicle computing system may periodically determine one or more updates to the parking trajectory 130 based on the inertial-based reference system. In such examples, the vehicle computing system may be configured to periodically update the parking trajectory 130, such as based on one or more objects detected in the environment located at least a lateral distance (X) and a longitudinal distance (Y) from the vehicle 102 (e.g., according to the body-centric inertial-based reference system). For example, the vehicle computing system may detect an object operating a distance and direction from the vehicle 102 based on the inertial-based reference system. The vehicle computing system may determine a predicted trajectory associated with the object, such as utilizing techniques described in U.S. patent application Ser. No. 15/807,521, filed Nov. 8, 2017, and entitled "Probabilistic Heat Maps for Behavior Prediction," U.S. patent application Ser. No. 16/151,607, filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of each are incorporated herein by reference. Based on determining that the predicted trajectory associated with the object conflicts with the parking trajectory 130, the vehicle computing system may update (e.g., modify) the parking trajectory, such as to yield or otherwise prevent a conflict (e.g., collision) between the vehicle 102 and the object.

FIG. 2B depicts an example process 200B for controlling the vehicle 102 from the parking location 114 to the route 120. In various examples, the vehicle computing system may determine to initiate movement from the parking location 114 to a new destination. In various examples, the new destination may be determined based on an input from a passenger, such as an input requesting that the vehicle 102 transport the passenger from the parking location 114 to the new destination. In some examples, the new destination may be associated with another location, such as a storage location for parking the vehicle overnight, a charging station, refueling station, or the like. In such examples, the vehicle computing system may determine to depart the parking location 114 for the new destination based on a determination to refuel, recharge, stop operation for a period of time, or the like.

At operation 208, the process may include determining a route return location based at least in part on at least one of a lateral distance 210 from the route and a heading 212 of the vehicle 102. The route return location 132 may represent an estimated location associated with the vehicle 102 rejoining the route 120 and/or the route structure (e.g., a different route). In some examples, the route return location 132 may represent a location at which the vehicle computing system may transition from the inertial based reference system to the route-based reference system. In some examples, the route return location 132 may represent a point at which the vehicle computing system may transition from controlling the vehicle according to off-route trajectory to a route-based trajectory.

In various examples, the lateral distance 210 may include a distance from a route 120 closest to the vehicle 102. In some examples, the lateral distance 210 may include the distance from the vehicle 102 to a route 120 determined based on the new destination. In such examples, the vehicle computing system may determine the route 120 based on the parking location 114, the new destination, and one or more maps depicting one or more routes 120 between the parking location 114 and the new destination.

In various examples, the route return location 132 may be determined based on an angular difference between the heading 212 of the vehicle 102 and a direction associated with the route 120. In some examples, the heading 212 may be based on a direction in which the vehicle is facing in the parking zone 112. In such an example, the angular difference between the heading 212 and the direction associated with the route may be based on a heading 212 associated with the front of the vehicle 102.

In some examples, the vehicle 102 may include a bi-directional vehicle 102. In such examples, the vehicle computing system may be configured to drive the vehicle 102 in both directions. For example, as illustrated in FIGS. 2A and 2B, the vehicle 102 may lead with a first side of the vehicle 102 into the parking zone 112 based on the parking trajectory 130 and may lead with a second side of the vehicle 102 when departing the parking zone 112, as represented by heading 212.

In some examples, the vehicle computing system may determine a side of the vehicle 102 that is closest to the route 120 (e.g., a side associated with the smallest lateral distance 210) and may determine the angular difference based on the side that is closest to the route 120 (as depicted in FIG. 2B). In various examples, the vehicle computing system may determine the heading 212 associated with a side with a smallest angular difference from the direction associated with the route. In such examples, the vehicle computing system may determine to initiate movement in a direction associated with the least heading error from the route. In various examples, the determination of a side with which to lead the vehicle out of a parking zone 112 may be based on one or more of a direction of travel associated with the route 120, an orientation of the vehicle 102 in the parking zone 112, objects proximate the parking zone 112, and/or any other factors that may affect the vehicle control out of a parking zone 112.

In various examples, the route return location 132 may be determined based on a sigmoid function. In such examples, the lateral distance and/or heading error (e.g., angular difference) may be applied to the sigmoid function to determine the route return location 132. The sigmoid function may include one or more parameters, such as a minimum distance along the route 120 (e.g., 10 meters, 11 feet, 11 yards, etc.), a maximum distance along the route 120 (e.g., 15 meters, 15 feet, 16 yards, etc.), a constant (e.g., steepness factor), a threshold lateral distance between the route 120 and the vehicle, and/or a nominal turning radius associated with the vehicle, as described above. In other examples, the route return location 132 may be determined based on one or more other functions, such as a Bezier function, or any other smooth and continuous function constrained by at least a maximum and minimum distance along the route.

In various examples, the maximum and minimum distances may be determined based at least in part on heuristics, experiments, kinematics of the vehicle, and the like. In at least one example, the minimum distance may be determined based on kinematics of the vehicle, such as a minimum turning radius, a maximum turning radius, and the like. In various examples, the minimum distance may include a distance within a range of minimum distances, such as between 8-12 meters, 13-16 feet, etc.

At operation 214, the process may include determining a route return trajectory 134 based at least in part on the parking location 114 and the route return location 132. In various examples, the vehicle computing system may determine the route return trajectory 134 based on the inertial-based reference system. Similar to the parking trajectory described above, the vehicle computing system may determine a reference trajectory, a corridor, and/or an initial trajectory associated with vehicle 102 travel between the parking location 114 and the route return location 132. The vehicle computing system may optimize the reference trajectory, the corridor, and/or an initial trajectory to determine the route return trajectory 134.

At operation 216, the process may include controlling the vehicle based at least in part on the route return trajectory 134. In various examples, the vehicle computing system may control the vehicle based on the route return trajectory 134 to rejoin the route 120 and travel to the destination. In some examples, the vehicle computing system may control the vehicle to the route based on the inertial-based reference system. In such examples, the vehicle computing system may determine one or more route return trajectories 134 (e.g., updates to the route return trajectory 134, such as periodic updates). The route return trajectories 134 may include off-route trajectories.

Additionally, the vehicle computing system may determine one or more route-based trajectories during vehicle control based on the route return trajectory 134. In various examples, the vehicle computing system may determine costs associated with the route return trajectories 134 and the route-based trajectories and may select a lowest cost trajectory by which to control the vehicle. In such an example, the vehicle computing system may control the vehicle based on the route return trajectory 134 until determining that a cost associated with a route-based trajectory is lower than a cost associated with the route return trajectory 134. Based on a determination that the route-based trajectory includes a lower cost, the vehicle computing system may transition to a route-based reference system, controlling the vehicle toward the new destination based on the route-based trajectory.

FIGS. 3A and 3B illustrate an example environment 300 in which a vehicle 302, such as vehicle 102, is controlled to a parallel parking location based at least in part on an inertial-based reference system, in accordance with embodiments of the disclosure. FIG. 3A illustrates movement of the vehicle 302 to a first parallel parking location 304. In various examples, a vehicle computing system may identify the parking zone 306 based on a destination associated with the vehicle, such as a passenger pickup, a passenger drop-off, a charging station, or the like.

In various examples, the vehicle computing system may determine that the vehicle 302 may not be configured to maneuver into the parking zone 306 in a single maneuver (e.g., a single pull-in). In various examples, the determination may be based on one or more criteria associated with parking the vehicle 302, such as a distance from objects 308 located proximate the parking zone 306, a maximum distance from a curb, a minimum distance from a driving lane 310, and the like. In some examples, the vehicle computing system may determine a final parking location (represented as the second parallel parking location 312). The vehicle computing system may determine that a single maneuver may be insufficient to park the vehicle 102 at the second parking location, while satisfying the criteria for parking the vehicle 302.

In various examples, based on a determination that a single maneuver may be insufficient to park the vehicle 102, the vehicle computing system may determine the first parallel parking location 304. The first parallel parking location 304 may represent an intermediate location for the vehicle 302 to travel before transitioning to a parked position at the second (final) parallel parking location 312. In various examples, based in part on identifying the parking zone 306 and/or the first parallel parking location 304, the vehicle computing system may determine a first parking trajectory 314 from an initial location 316 on a route 318 to the first parallel parking location 304. In various examples, the initial location 316 may represent a point along the route 318 at which the vehicle computing system may transition from a route-based reference system to an inertial-based reference system.

As discussed above, the vehicle computing system may determine that a cost associated with the first parking trajectory 314 may be less than a route-based trajectory associated with the route 318. In such an example, the vehicle computing system may determine to control the vehicle according to the first parking trajectory 314. The vehicle computing system may determine the first parking trajectory 314 based on an optimization associated with a reference trajectory, a corridor, and/or an initial trajectory, as described above. In various examples, the vehicle computing system may control the vehicle according to the first parking trajectory 314 into the parking zone 306, to stop at or about the first parallel parking location 304.

FIG. 3B illustrates an exploded view of the parking zone 306 in which the vehicle computing system may navigate the vehicle based on the inertial-based reference system to the second parallel parking location 312. In various examples, the vehicle computing system may determine a second parking trajectory 320 from the first parallel parking location 304 to the second parallel parking location 312. In various examples, the second parking trajectory 320 may be determined based on an optimization associated with a reference trajectory, a corridor, and/or an initial trajectory, as described above. For example, the second parking trajectory 320 may be associated with the inertial-based reference system. Based on a determination that the second parking location 312 satisfies the criteria associated with parking the vehicle 302, the vehicle computing system may determine to stop the vehicle (e.g., park) at the second parallel parking location 312.

FIG. 4 illustrates a table 400 of example route return trajectories 402 a vehicle 404, such as vehicle 102 and 302, may travel to return to a route 406, such as route 120 and 318, in accordance with embodiments of the disclosure. Though the illustrated route return trajectories 402 represent the vehicle joining a route 406 in a same direction, this is for illustrative purposes and is not intended to be limiting. For example, a route return trajectory 402 may include a U-turn or a maneuver substantially similar to a U-turn, and/or any other turn between 90 and 210 degrees.

In the illustrative example, a first column 408 represents the vehicle 404 at a first lateral distance from the route 406, a second column 410 represents the vehicle 404 at a second lateral distance from the route 406, and a third column 412 represents the vehicle 404 at a third lateral distance from the route 406. Additionally as illustrated, a first row 414 represents a 45 degree heading error of the vehicle 404 away from the route 406 (e.g., positive heading error), a second row 416 represents a zero degree heading error of the vehicle 404, and a third row 418 represents a 45-degree heading error of the vehicle 404 toward the route 406.

As discussed above, the route return trajectories 402 may be determined based on a route return location and an initial location associated with the vehicle 404. In some examples, the route return location may be determined based on a sigmoid function, a Bezier function, or any other function comprising one or more parameters. The route return location may be determined based on the heading error and the lateral distance associated with the vehicle 404. In some examples, the route return trajectories 402 may be determined based on an optimization of a reference trajectory, a corridor, and/or an initial trajectory between an initial location and the route return location associated with the vehicle 404 rejoining the route, such as that described above.

In some examples, the vehicle computing system may cause the vehicle to travel a distance away from the route 406 before proceeding back toward the route 406. In at least one example, the vehicle computing system may determine to travel the distance away from the route 406 based on a positive heading error of the vehicle 404 (e.g., vehicle 404 heading away from the route 406). As an illustrative example, the first row 414 may represent a positive heading error away from the route. Due to the positive heading error, the associated route return trajectories 402 may include the vehicle 404 traveling a distance from the route before returning to the route 406.

In some examples, the vehicle computing system may cause the vehicle 404 to transition through the route 406, travel a distance (D) away from the route 406 and return to the route. In various examples, the transition through the route 406 may be based on a lateral distance from the route 406 being less than a threshold distance and/or a heading error associated with the vehicle 404 being above a threshold heading error. In various examples, the threshold distance may be determined based on a turning radius associated with the vehicle 404, such as a minimum turning radius, or a value related thereto (e.g., $1.1 \times r_{min}$). In some examples, the threshold heading error may be associated with the turning radius of the vehicle 404. For example, as illustrated in the third row 418 and first column 408, the vehicle 404 controlled based in part on the route return trajectory 402 may transition through the route 406, travel the distance (D) from the route 406, and return to the route 406. In various examples, the vehicle computing system may transition from the inertial based reference system to a route-based reference system at or proximate to the route return location.

Though FIG. 4 includes multiple illustrations of different route return trajectories 402 determined based at least in part on the heading error and the lateral distances, the route return trajectories 402 are not intended to be limiting to the illustrated movements and any path, trajectory, or set of trajectories to return a vehicle to a route based on an inertial-based reference system are contemplated herein.

Figure 5:
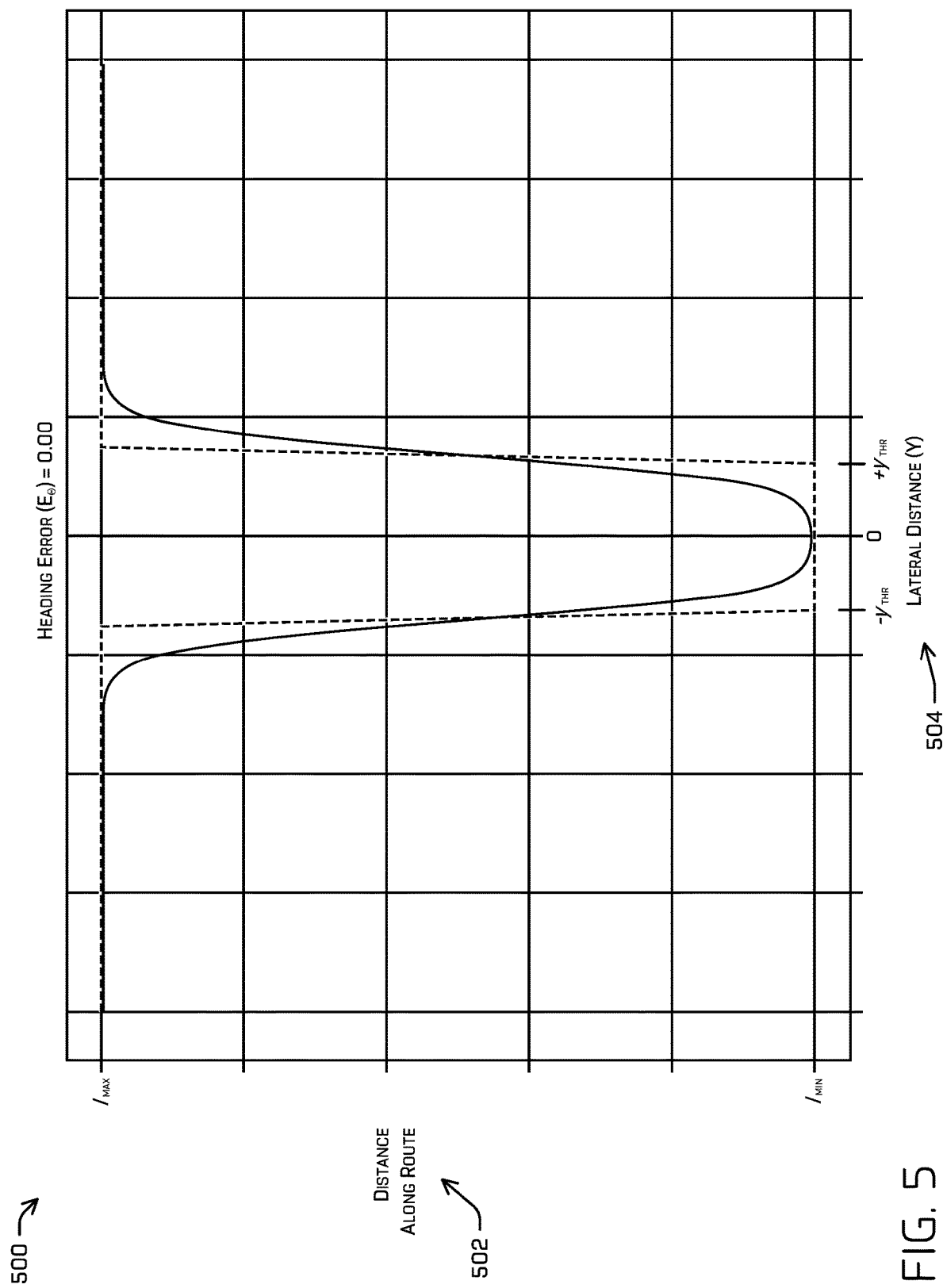
FIG. 5 is an illustration of a chart of distances along a route for a vehicle with a zero-degree heading error to return to the route based in part on a lateral distance from the route, in accordance with embodiments of the disclosure.

FIG. 5 is an illustration of a chart 500 of distances 502 along a route for a vehicle, such as vehicle 102, 302, and 404 with a zero-degree heading error ($e_\theta$) to travel to the route based in part on a lateral distance (Y) 504 from the route, in accordance with embodiments of the disclosure. The distances 502 may be associated with route return locations, such as route return location 132. Example trajectories and distances associated with the chart 500 may depicted in Row 416 of FIG. 4.

In various examples, the route return locations and distances along the route associated therewith may be determined based on a sigmoid function or other smooth and continuous function with one or more parameters. The parameters may include a minimum distance ($l_{min}$) along the route for the vehicle to travel (e.g., 8 meters, 8 yards, 10 meters, 30 feet, etc.) and a maximum distance ($l_{max}$) along the route for the vehicle to travel (e.g., 15 meters, 15 yards, 20 meters, 60 feet, etc.). As discussed above, the values for the minimum distance ($l_{min}$) and the maximum distance ($l_{max}$) may be determined based on heuristics, driving experiments, and kinematics associated with the vehicle.

In some examples, the sigmoid or other function may include additional parameters, such as a threshold lateral distance. In the illustrative example, the threshold lateral distance may include a maximum distance in units of measurement (e.g., meters, feet, yards, etc.) on either side of a center of the route (represented as Y=0). The threshold lateral distance may include 3.5 meters, 10 meters, 20 meter, 20 feet, 20 yards, or the like. In some examples, the threshold lateral distance may be determined based on heuristics, experiments, a minimum turn radius of the vehicle, the nominal turning radius of the vehicle, a maximum turning radius of the vehicle, or other kinematics associated with the vehicle.

As illustrated in FIG. 5, as the lateral distance 504 associated with the vehicle increases, the distance 502 along the route increases to the maximum distance ($l_{max}$).

As discussed above, the sigmoid or other smooth and continuous function may include additional parameters, such as a steepness parameter (described above as k) and a nominal turning radius. The nominal turning radius may be determined based on a minimum turning radius associated with the vehicle. In some examples, the nominal turning radius may include the minimum turning radius multiplied by a factor (e.g., 1.05, 1.07, 1.2, or the like). In various examples, determining the nominal turning radius as a function of the minimum turning radius may introduce an operational feasibility associated with the route return location determined based on the sigmoid function. In such examples, the vehicle may not be operationally limited in navigating to the route return location based on the increase in the nominal turning radius over the minimum turning radius.

Figure 6:
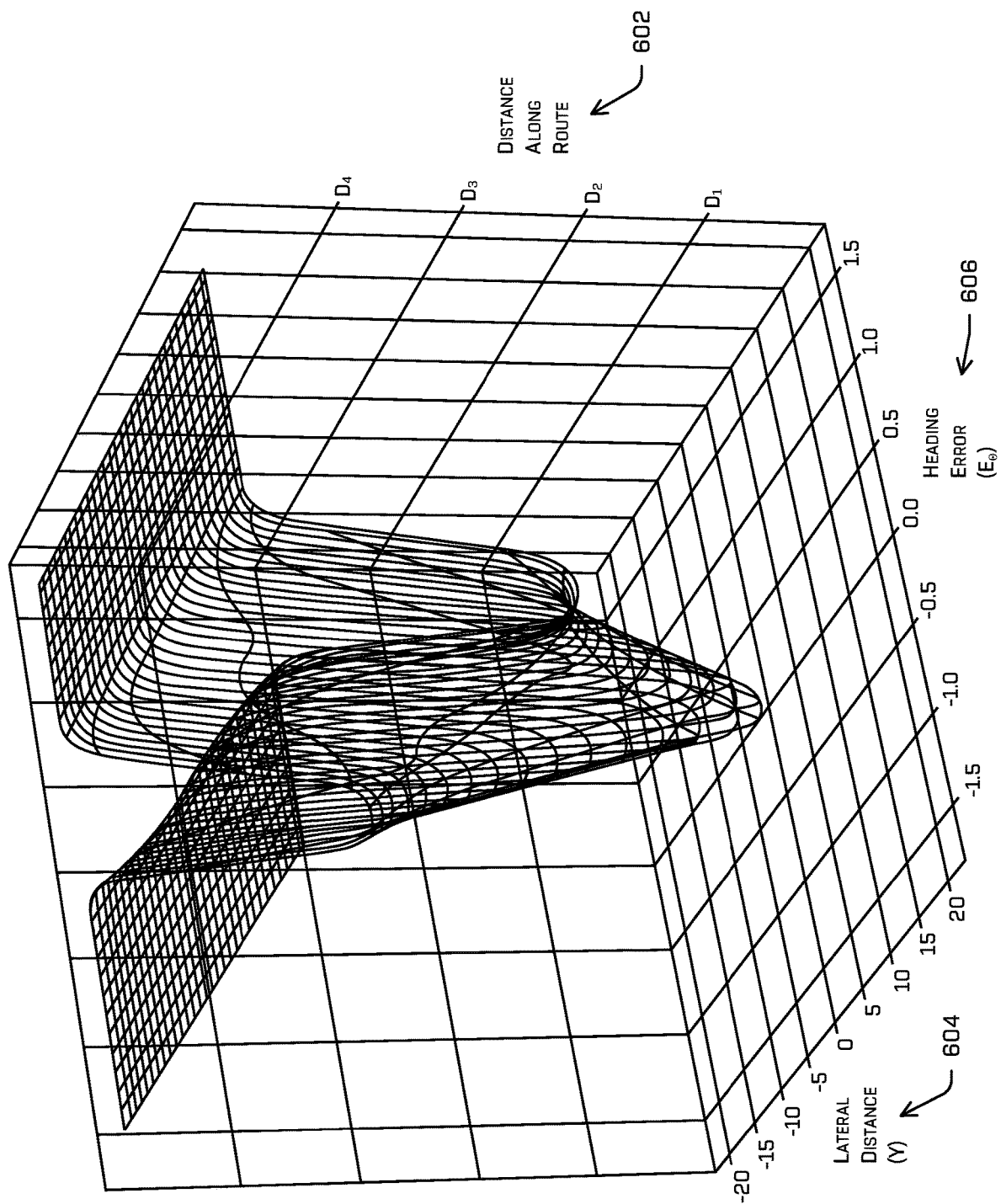
FIG. 6 is an illustration of a chart of distances along a route for a vehicle to return to the route based in part on a lateral distance and heading error associated with the vehicle, in accordance with embodiments of the disclosure.

FIG. 6 is an illustration of a chart 600 of distances 602 along a route for a vehicle to return to the route based in part on a lateral distance 604 and heading error ($e_\theta$) 606 associated with the vehicle, in accordance with embodiments of the disclosure. In at least one example, the chart 600 represents an illustration of the distances 602 along a route associated with route return points determined based at least in part on a sigmoid function. In such an example, the chart 600 illustrates the shape of the function, based on varying lateral distances 604 and heading errors ($e_\theta$) 606. Though illustrated as lateral distances 604 between −20 and +20 units of measurement (e.g., feet, meters, yards, etc.), it is understood that this is merely an illustrative example, and the lateral distances may include any value up to and including a threshold lateral distance ($y_{thr}$), such as that described above with respect to FIG. 5.

As described above, the sigmoid or other smooth and continuous function may be limited by maximum and minimum values. In the illustrative example, the bottom of the chart 600 may represent the minimum value (e.g., minimum distance ($l_{min}$)) and the top of the chart 600 may represent the maximum value (e.g., maximum distance ($l_{max}$)).

Figure 7:
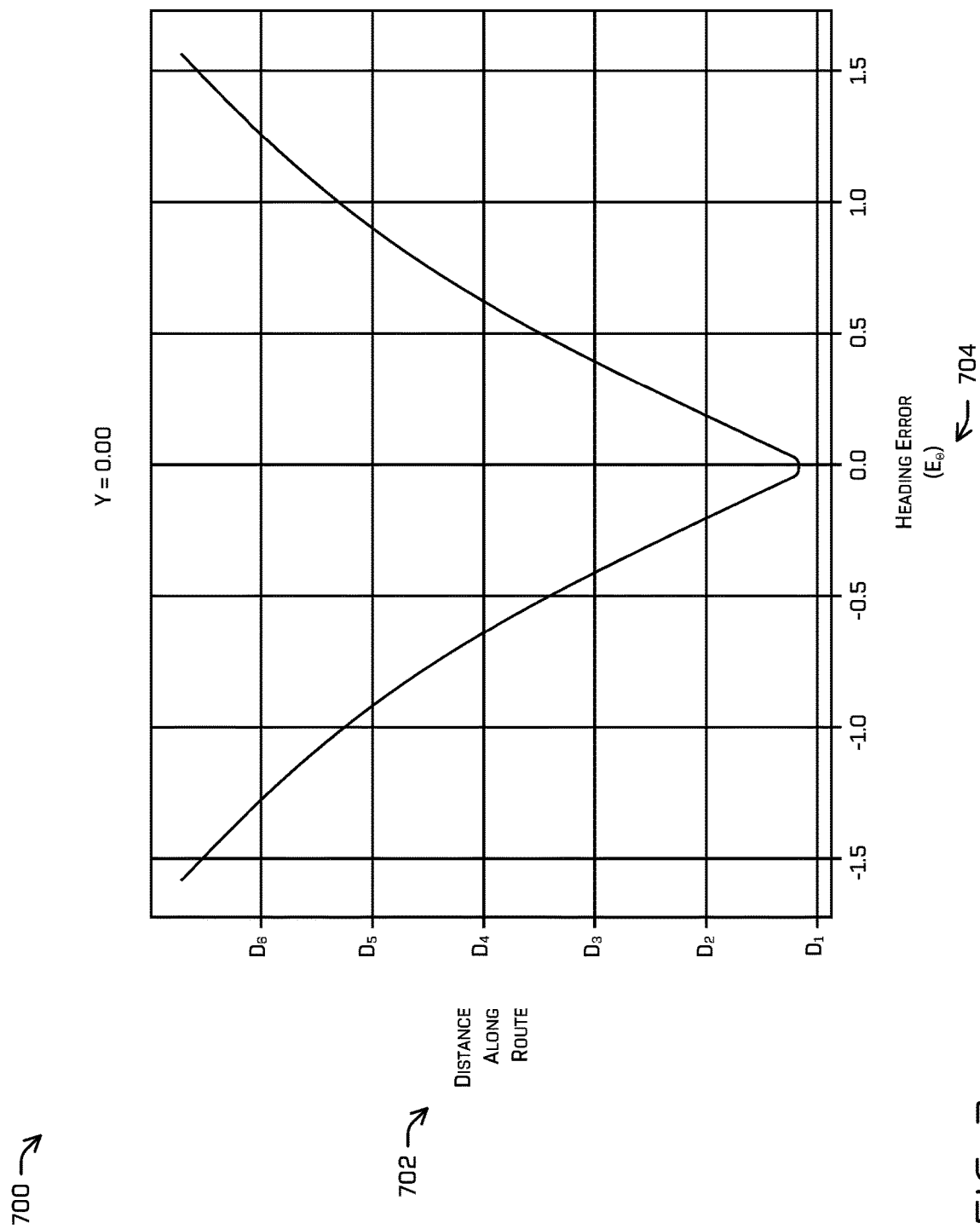
FIG. 7 is an illustration of a chart of distances along a route for a vehicle located on the route with various heading errors to return to the route, in accordance with embodiments of the disclosure

FIG. 7 is an illustration of a chart 700 of distances 702 along a route for a vehicle located on the route (e.g., lateral distance (Y) of zero) with various heading errors ($e_\theta$) 704 to return to the route, in accordance with embodiments of the disclosure. In various examples, the vehicle computing system may determine that the vehicle is located on the route but has a heading error ($e_\theta$).

In some examples, the vehicle computing system may determine that the heading error ($e_\theta$) 704 is greater than a threshold heading error ($e_\theta$) 704. In some examples, the threshold heading error may include a minimum heading error ($e_\theta$) 704 in which the vehicle computing system may control the vehicle according to the route-based reference system. In such examples, the threshold heading error ($e_\theta$) 704 may include a minimal heading error that results in the vehicle traveling less than a threshold distance (e.g., less than 1 foot, less than 1 meter) from the route to be established on the route. As illustrated in FIG. 7, the flat portion at a bottom end of the chart 700 may represent the threshold positive and negative heading error ($e_\theta$) 704 extending to the left and the right of 0.0 heading error ($e_\theta$) 704.

Though the heading error ($e_\theta$) 704 is illustrated as 0.5, 1.0, 1.5 and negative increments thereof, this is not intended to be limiting to any unit of angle (e.g., degree, radian, etc.) associated with the heading error ($e_\theta$) 704. In some examples, the heading error ($e_\theta$) 704 may include 0.5x, 1.0x, 1.5x, where x is a unit of angle representing an angular difference between a heading of the vehicle and a route.

Figure 8A:
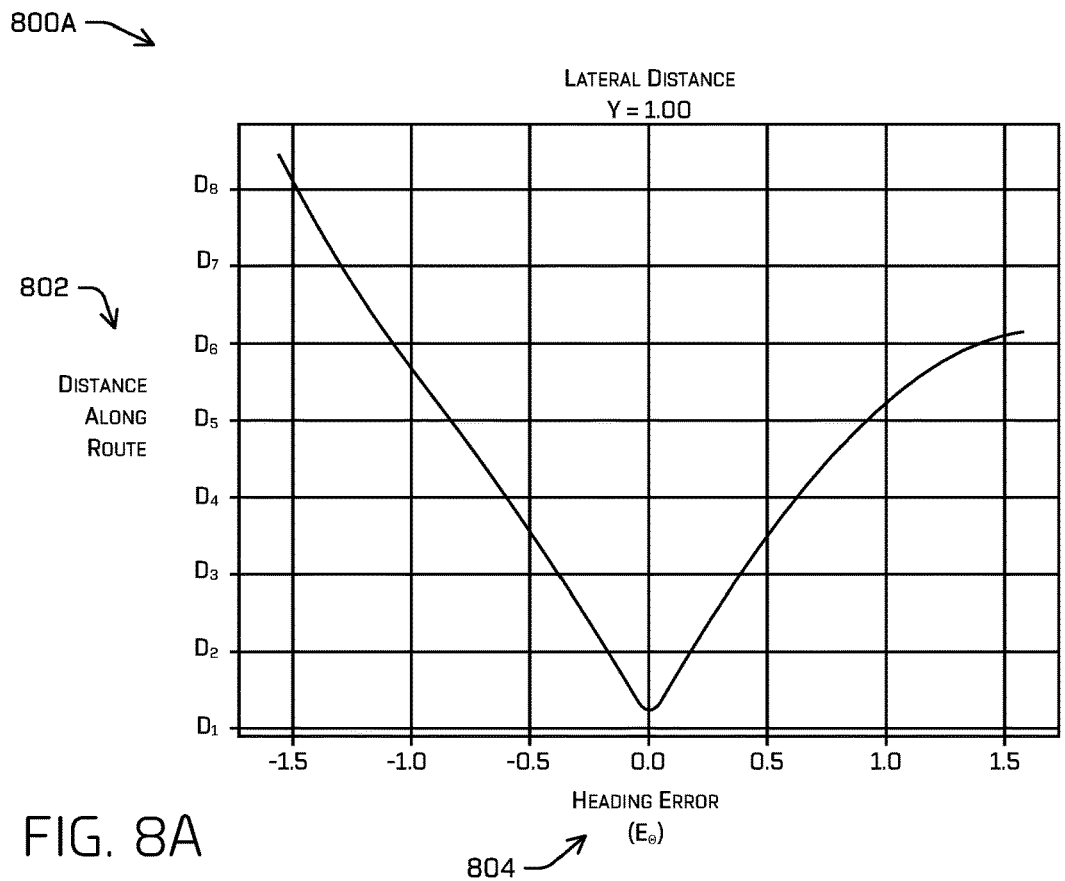
FIGS. 8A and 8B are illustrations charts of distances along a route for a vehicle with a small lateral offset to return to the route based at least in part on a heading error associated with the vehicle, in accordance with embodiments of the disclosure.
Figure 8B:
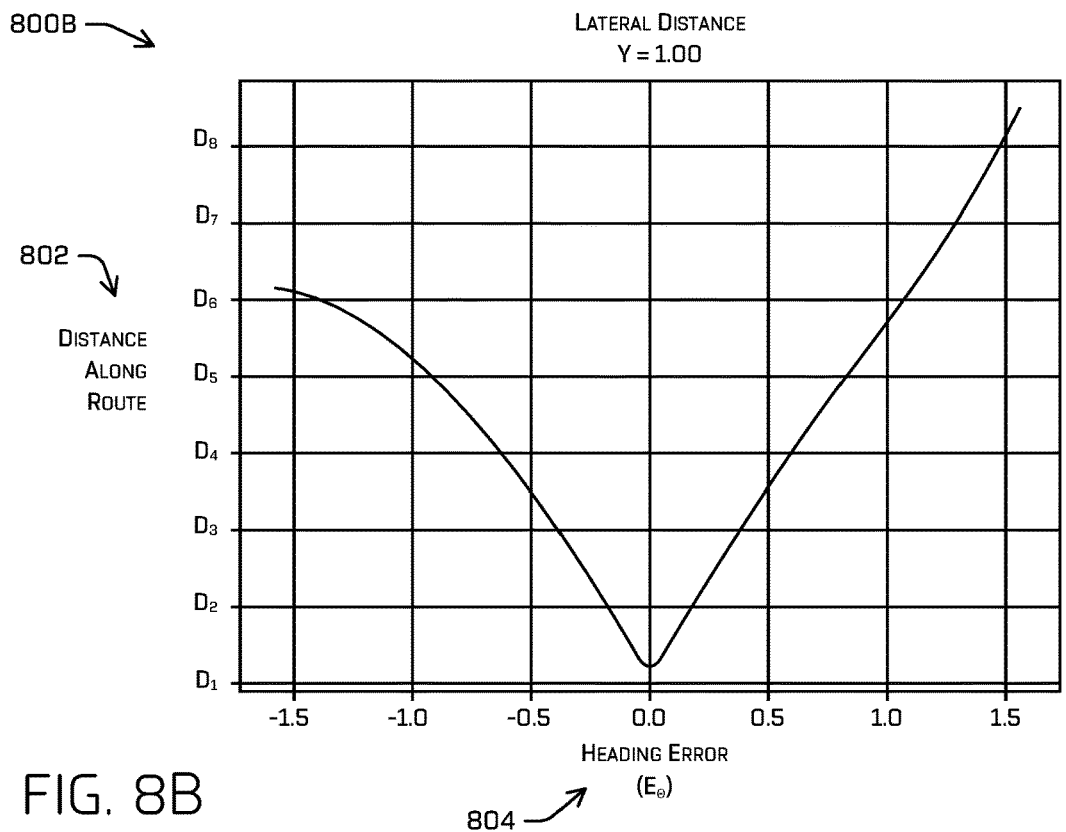

FIGS. 8A and 8B are illustrations charts 800A and 800B of distances 802 along a route for a vehicle with a small lateral offset (Y=1.0) to return to the route based at least in part on a heading error ($e_\theta$) 804 associated with the vehicle, in accordance with embodiments of the disclosure. FIG. 8A is an illustration of a chart 800A of distances along the route for the vehicle with a positive lateral offset (Y=±1.0) to return to the route. FIG. 8B is an illustration of a chart 800B of distances 802 along the route for the vehicle with a negative lateral offset ((Y=−1.0) to return to the route. Though illustrated as a lateral offset of 1.0, this is not intended to be limited to a particular unit of measurement or value thereof. For example, the lateral offset may include 1.0 feet or 1.0 meters, or the like, or it may include a 1× lateral offset, where x represents a unit of measurement (e.g., 5 meters, 5 feet, 6 feet, 6 yards, etc.).

As described above, the distances 802 may be determined based on a sigmoid function or other smooth and continuous function including maximum and minimum values. Though the heading error ($e_\theta$) 804 is illustrated as 0.5, 1.0, 1.5 units of angle (e.g., degrees, radian, etc.) and negative increments thereof, this is not intended to be limiting to any unit of angle associated with the heading error ($e_\theta$) 804. In some examples, the heading error ($e_\theta$) 804 may include 0.5x, 1.0x, 1.5x, where x is a unit of angle representing the angular difference between a heading of the vehicle and a route.

Figure 9A:
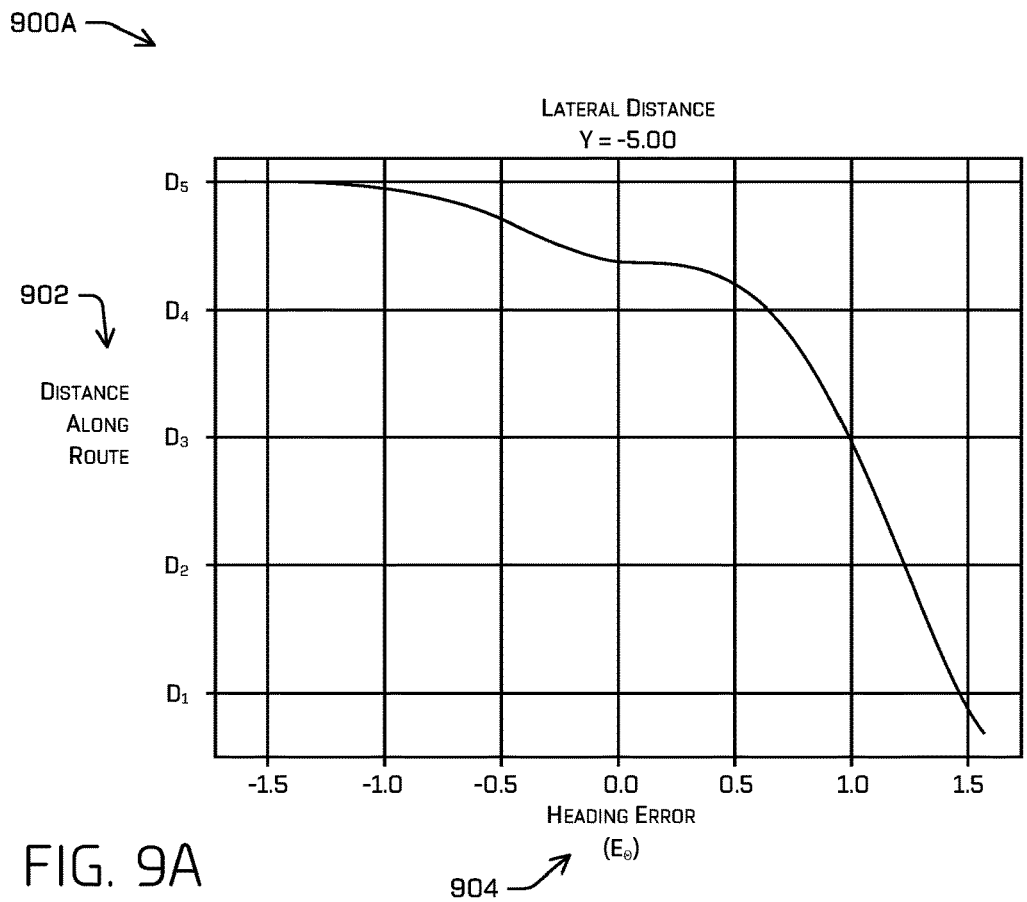
FIGS. 9A and 9B are illustrations charts of distances along a route for a vehicle with a large lateral offset to return to the route based at least in part on a heading error associated with the vehicle, in accordance with embodiments of the disclosure.
Figure 9B:
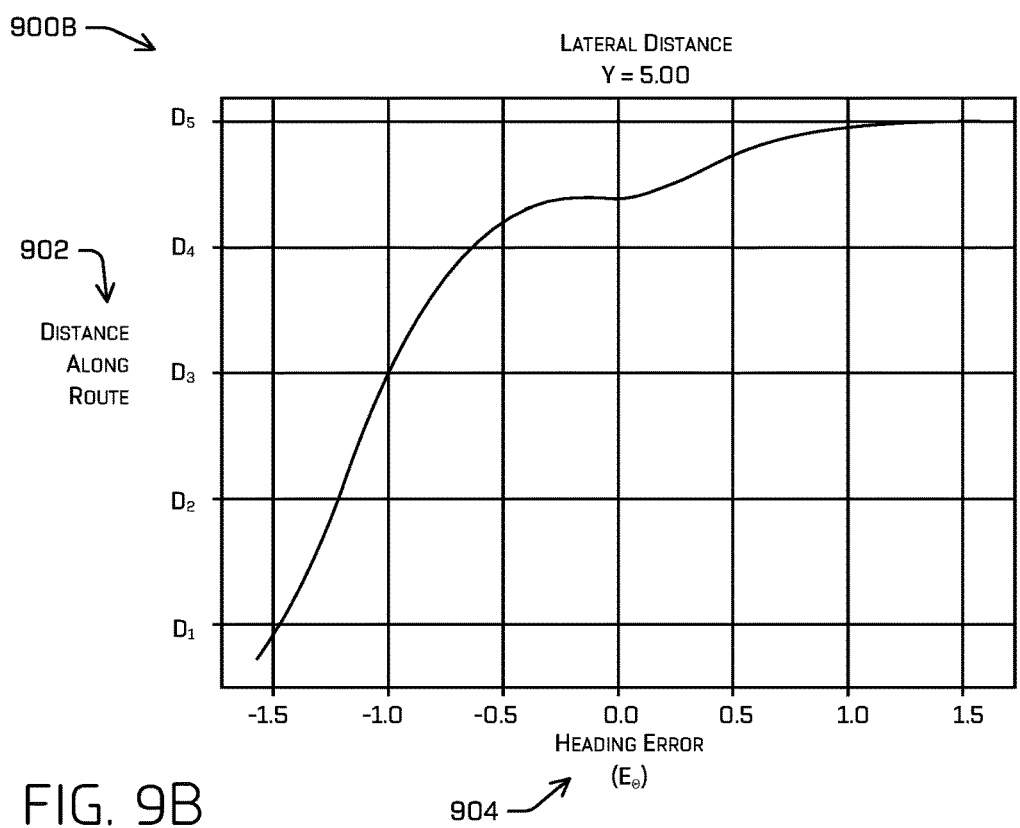

FIGS. 9A and 9B are illustrations charts 900A and 900B of distances 902 along a route for a vehicle with a large lateral offset (Y=5.0) to return to the route based at least in part on a heading error associated with the vehicle, in accordance with embodiments of the disclosure. FIG. 9A is an illustration of a chart 900A of distances 902 along the route for the vehicle with a large positive lateral offset (Y=+5.0) to return to the route. FIG. 9B is an illustration of a chart 900B of distances along the route for the vehicle with a large negative lateral offset (Y=−5.0) to return to the route. Though illustrated as a lateral offset of 5.0, this is not intended to be limited to a particular unit of measurement or value thereof. For example, the lateral offset may include 5.0 feet or 5.0 meters, or the like, or it may include a 5× lateral offset, where x represents a unit of measurement (e.g., 3 meters, 3 feet, 4 feet, 4 yards, etc.).

As described above, the distances 902 may be determined based on a sigmoid function or other smooth and continuous function including maximum and minimum values. Though the heading error ($e_\theta$) 904 is illustrated as 0.5, 1.0, 1.5 units of angle (e.g., degrees, radian, etc.) and negative increments thereof, this is not intended to be limiting to any unit of measurement associated with the heading error ($e_\theta$) 904. In some examples, the heading error ($e_\theta$) 904 may include 0.5x, 1.0x, 1.5x, where x is a unit of angle representing the angular difference between a heading of the vehicle and a route.

Figure 10:
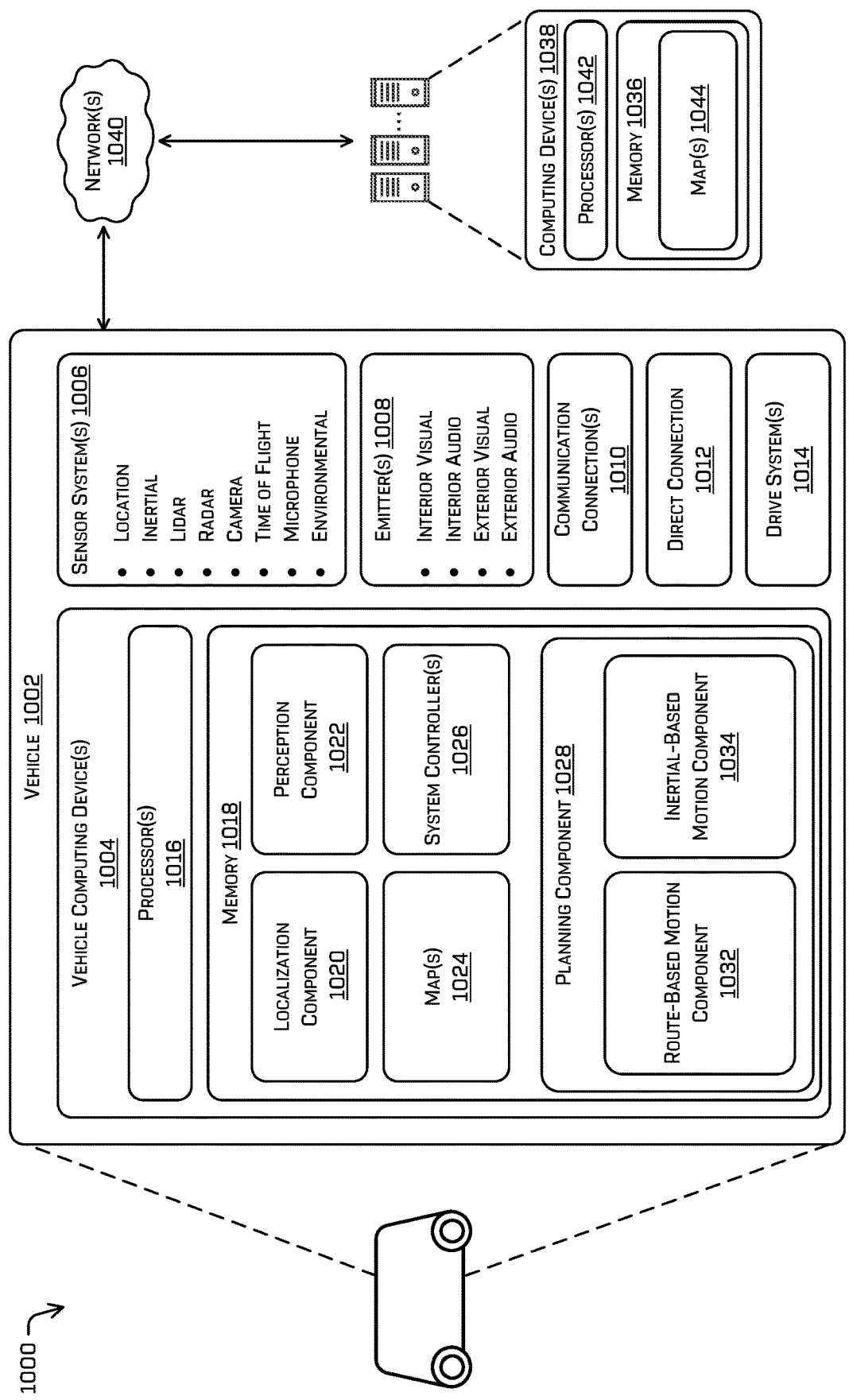
FIG. 10 is a block diagram of an example system for implementing the techniques described herein.

FIG. 10 is a block diagram of an example system 1000 for implementing the techniques described herein. In at least one example, the system 1000 may include a vehicle 1002, such as the vehicle 1002.

The vehicle 1002 may include one or more vehicle computing devices 1004, one or more sensor systems 1006, emitter(s) 1008, one or more communication connections 1010, at least one direct connection 1012, and one or more drive modules 1014.

The vehicle computing device(s) 1004 may include one or more processors 1016 and memory 1018 communicatively coupled with the processor(s) 1016. In the illustrated example, the vehicle 1002 is an autonomous vehicle; however, the vehicle 1002 could be any other type of vehicle, such as a semi-autonomous vehicle, or any other system having at least an image capture device (e.g., a camera enabled smartphone). In the illustrated example, the memory 1018 of the vehicle computing device(s) 1004 stores a localization component 1020, a perception component 1022, one or more maps 1024, one or more system controllers 1026, and a planning component 1028 including route-based motion component 1032, such as route-based motion component 118, and inertial-based motion component 1034, such as inertial-based motion component 122. Though depicted in FIG. 10 as residing in the memory 1018 for illustrative purposes, it is contemplated that the localization component 1020, the perception component 1022, the map(s) 1024, the system controller(s) 1026, and the planning component 1028 including the route-based motion component 1032, and the inertial-based motion component 1034, may additionally, or alternatively, be accessible to the vehicle 1002 (e.g., stored on, or otherwise accessible by, memory remote from the vehicle 1002, such as, for example, on memory 1036 of a remote computing device(s) 1038.

In at least one example, the localization component 1020 may include functionality to receive sensor data from the sensor system(s) 1006 to determine a position and/or orientation of the vehicle 1002 (e.g., one or more of an x-, y-, z-position, roll, pitch, or yaw). For example, the localization component 1020 may include and/or request/receive a map of an environment and may continuously determine a location and/or orientation of the autonomous vehicle within the map. In some instances, the localization component 1020 may utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 1020 may provide data to various components of the vehicle 1002 to determine an initial position of an autonomous vehicle for generating a one or more route-based trajectories and/or one or more inertial-based trajectories associated with vehicle travel on and off a route, as discussed herein.

In some instances, the perception component 1022 may include functionality to perform object detection, segmentation, and/or classification. In some examples, the perception component 1022 may provide processed sensor data that indicates a presence of an agent (e.g., entity) that is proximate to the vehicle 1002 and/or a classification of the agent as an agent type (e.g., car, pedestrian, cyclist, animal, building, tree, road surface, curb, sidewalk, unknown, etc.). In some examples, the perception component 1022 may provide processed sensor data that indicates a presence of a stationary entity that is proximate to the vehicle 1002 and/or a classification of the stationary entity as a type (e.g., building, tree, road surface, curb, sidewalk, unknown, etc.). In some examples, the perception component 1022 may provide object data associated with a detected object to the inertial-based motion component 1034, such as for determining a corridor as discussed above and below.

In additional or alternative examples, the perception component 1022 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

The memory 1018 may further include the map(s) 1024 that may be used by the vehicle 1002 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1002 may be controlled based at least in part on the map(s) 1024. That is, the map(s) 1024 may be used in connection with the localization component 1020, the perception component 1022, and/or the planning component 1028 to determine a location of the vehicle 1002, detect objects in an environment, identify parking zones and/or parking locations within an environment, and/or generate routes and/or trajectories to navigate within an environment, both based on a route-based reference system or an inertial based reference system.

In some examples, the map(s) 1024 may be stored on a remote computing device(s) (such as the computing device(s) 1038) accessible via network(s) 1040. In some examples, multiple maps 1024 may be stored based on, for example, a characteristic (e.g., type of entity, time of day, day of week, season of the year, etc.). Storing multiple maps 1024 may have similar memory requirements, but increase the speed at which data in a map may be accessed.

In at least one example, the vehicle computing device(s) 1004 may include the system controller(s) 1026, which may be configured to control steering, propulsion, braking, safety, emitters, communication, and other systems of the vehicle 1002. The system controller(s) 1026 may communicate with and/or control corresponding systems of the drive module(s) 1014 and/or other components of the vehicle 1002.

In general, the planning component 1028 may determine a path for the vehicle 1002 to follow to traverse through an environment. For example, the planning component 1028 may determine various routes and trajectories and various levels of detail. For example, the planning component 1028 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 1028 may generate an instruction for guiding the autonomous vehicle 1002 along at least a portion of the route from the first location to the second location. In at least one example, the planning component 1028 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 1002 to navigate.

The route-based motion component 1032 may be configured to determine one or more route-based trajectories for the vehicle 1002 based on a route-based reference system. In some examples, the route-based reference system may include a route-centric reference frame. In such examples, locations in the environment, such as locations associated with detected objects, may be determined based on a distance and direction from the route. In various examples, the one or more route-based trajectories based on the route-based reference system may correspond to one or more actions associated with traveling on a route, such as continuing straight in a lane, lane change left, lane change right, and/or various velocities associated with the actions.

In various examples, the route-based motion component 1032 may be configured to determine a cost associated with the one or more route-based trajectories based on the route-based reference system. The cost may be based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like, such as those described in the U.S. Patent Application incorporated herein above.

The inertial-based motion component 1034 may be configured to determine one or more off-route trajectories for the vehicle 1002 based on an inertial-based reference system. In various examples, the off-route trajectories may be determined based on an optimization associated with a reference trajectory, a corridor, and/or an initial trajectory. The optimization may be performed utilizing differential dynamic programming or any other optimization algorithm configured to determine a dynamically feasible trajectory.

In various examples, the inertial-based motion component 1034 may initiate off-route trajectory determinations based on a determination that one or more conditions for off-route travel are satisfied. The conditions may include a determination that the vehicle 1002 is within a first threshold distance (illustrated as $D_1$) from a destination (e.g., goal), that a parking zone and/or parking location is identified, that the parking zone and/or parking location is within a second threshold distance of the destination, that the parking zone and/or parking location is unoccupied (e.g., no objects present in the parking zone and/or parking location), and/or that a length and width of the parking zone and/or parking location is visible to the vehicle 1002 (e.g., visible to the perception component 1022, not occluded).

In some examples, the inertial-based motion component 1034 may initiate off-route trajectory determinations based on a determination that an emergency vehicle is detected in the environment and is relevant to the vehicle 1002. In some examples, the emergency vehicle may be relevant to the vehicle 1002 based on a determination that the emergency vehicle is emitting at least one of a flashing light or a siren. In some examples, the emergency vehicle may be relevant to the vehicle 1002 based on a determination that an emergency vehicle trajectory is associated with the driving lane, the route, a direction of travel associated with the vehicle, or the like. In some examples, the emergency vehicle may be relevant to the vehicle 1002 based on a determination, by the planning component 1028, to yield thereto, such as that based on one or more of the factors described above (e.g., emergency vehicle trajectory, siren, lights, etc.). Based on a determination that the emergency vehicle is relevant to the vehicle 1002, the inertial-based motion component 122 may determine one or more off-route trajectories, such as that associated with a pull-over action to yield to the emergency vehicle.

In various examples, the inertial-based motion component 1034 may be configured to determine a cost associated with the one or more off-route trajectories. Similar to the costs described above with respect to the route-based trajectories, the costs associated with the off-route trajectories may be based on safety, comfort, progress, operating rules, or the like. In various examples, route-based motion component 1032 and the inertial-based motion component 1034 may determine the route-based and off-route trajectories and associated costs in parallel. In some examples, the planning component 1028 may determine a trajectory (route-based trajectory or off-route trajectory) for operating the vehicle based on a lowest cost trajectory. In such examples, the planning component 1028 may compare the costs associated with a route-based trajectory and an off-route trajectory from an initial location and may control the vehicle according to the trajectory with the lowest cost.

As can be understood, the components discussed herein (e.g., the localization component 1020, the perception component 1022, the map(s) 1024, the system controller(s) 1026, the planning component 1028 including the route-based motion component 1032 and the inertial-based motion component 1034 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 1018 (and the memory 1036, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 1006 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1006 may include multiple instances of each of these or other types of sensors. For instance, the LIDAR sensors may include individual LIDAR sensors located at the corners, front, back, sides, and/or top of the vehicle 1002. As another example, the camera sensors may include multiple cameras disposed at various locations about the exterior and/or interior of the vehicle 1002. The sensor system(s) 1006 may provide input to the vehicle computing device(s) 1004. Additionally or alternatively, the sensor system(s) 1006 may send sensor data, via the one or more networks 1040, to the one or more computing device(s) 1038 at a particular frequency, after a lapse of a predetermined period of time, in near real-time, etc.

The vehicle 1002 may also include emitter(s) 1008 for emitting light and/or sound, as described above. The emitter(s) 1008 in this example include interior audio and visual emitters to communicate with passengers of the vehicle 1002. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1008 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1002 may also include one or more communication connection(s) 1010 that enable communication between the vehicle 1002 and one or more other local or remote computing device(s). For instance, the communication connection(s) 1010 may facilitate communication with other local computing device(s) on the vehicle 1002 and/or the drive module(s) 1014. Also, the communication connection(s) 1010 may allow the vehicle to communicate with other nearby computing device(s) and/or one or more remote computing device(s) 1038 for receiving sensor data.

The communications connection(s) 1010 may include physical and/or logical interfaces for connecting the vehicle computing device(s) 1004 to another computing device or a network, such as network(s) 1040. For example, the communications connection(s) 1010 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 1002 may include drive module(s) 1014. In some examples, the vehicle 1002 may have a single drive module 1014. In at least one example, if the vehicle 1002 has multiple drive modules 1014, individual drive modules 1014 may be positioned on opposite ends of the vehicle 1002 (e.g., the front and the rear, etc.). In at least one example, the drive module(s) 1014 may include one or more sensor systems to detect conditions of the drive module(s) 1014 and/or the surroundings of the vehicle 1002. By way of example and not limitation, the sensor system(s) 1006 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 1014. In some cases, the sensor system(s)

on the drive module(s) 1014 may overlap or supplement corresponding systems of the vehicle 1002 (e.g., sensor system(s) 1006).

The drive module(s) 1014 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 1014 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive module(s) 1014. Furthermore, the drive module(s) 1014 may also include one or more communication connection(s) that enable communication by the respective drive module with one or more other local or remote computing device(s).

In at least one example, the direct connection 1012 may provide a physical interface to couple the one or more drive module(s) 1014 with the body of the vehicle 1002. For example, the direct connection 1012 may allow the transfer of energy, fluids, air, data, etc. between the drive module(s) 1014 and the vehicle. In some instances, the direct connection 1012 may further releasably secure the drive module(s) 1014 to the body of the vehicle 1002.

In at least one example, the localization component 1020, the perception component 1022, the map(s) 1024, the system controller(s) 1026, the planning component 1028 including the route-based motion component 1032 and the inertial-based motion component 1034, and various components thereof, may process the sensor data, as described above, and may send their respective outputs, over the one or more network(s) 1040, to the computing device(s) 1038. In at least one example, the localization component 1020, the perception component 1022, the map(s) 1024, the system controller(s) 1026, the planning component 1028 including the route-based motion component 1032 and the inertial-based motion component 1034 may send their respective outputs to the computing device(s) 1038 at a particular frequency, after a lapse of a predetermined period of time, in near real-time, etc.

In some examples, the vehicle 1002 may send the sensor data to the computing device(s) 1038 via the network(s) 1040. In some examples, the vehicle 1002 may receive sensor data from the computing device(s) 1038 via the network(s) 1040. The sensor data may include raw sensor data and/or processed sensor data and/or representations of sensor data. In some examples, the sensor data (raw or processed) may be sent and/or received as one or more log files.

The computing device(s) 1038 may include processor(s) 1042 and the memory 1036 storing one or more maps 1044, such as map(s) 1024. In some instances, the computing device(s) 1038 may be configured to perform one or more of the processes described herein with respect to the vehicle 1002. In such instances, the computing device(s) 1038 may send, to the vehicle 1002, data representing results of the processing.

The processor(s) 1016 of the vehicle 1002 and the processor(s) 1042 of the computing device(s) 1038 may be any suitable processor capable of executing instructions to process data and perform operations as described herein. By way of example and not limitation, the processor(s) 1016 and 1042 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 1018 and 1036 are examples of non-transitory computer-readable media. The memory 1018 and 1036 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 1018 and 1036 may include at least a working memory and a storage memory. For example, the working memory may be a high-speed memory of limited capacity (e.g., cache memory) that is used for storing data to be operated on by the processor(s) 1016 and 1042. In some instances, the memory 1018 and 1036 may include a storage memory that may be a lower-speed memory of relatively large capacity that is used for long-term storage of data. In some cases, the processor(s) 1016 and 1042 cannot operate directly on data that is stored in the storage memory, and data may need to be loaded into a working memory for performing operations based on the data, as discussed herein.

It should be noted that while FIG. 10 is illustrated as a distributed system, in alternative examples, components of the vehicle 1002 may be associated with the computing device(s) 1038 and/or components of the computing device(s) 1038 may be associated with the vehicle 1002. That is, the vehicle 1002 may perform one or more of the functions associated with the computing device(s) 1038, and vice versa.

Figure 11:
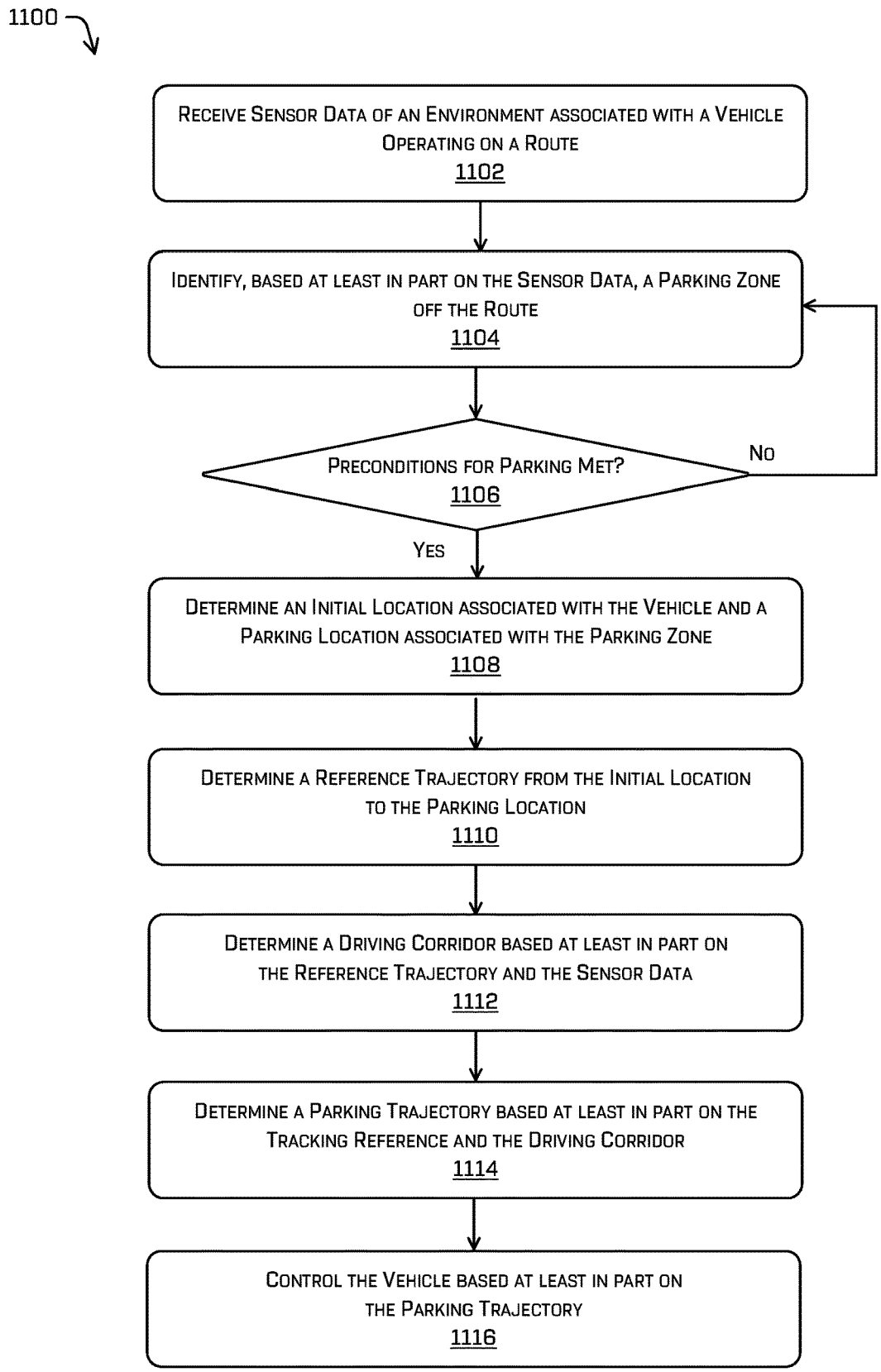
FIG. 11 depicts an example process for controlling a vehicle to a parking zone located off a route, in accordance with embodiments of the disclosure.

FIG. 11 depicts an example process 1100 for controlling a vehicle to a parking zone located off a route (e.g., at a location unassociated with the route), in accordance with embodiments of the disclosure. Some or all of the process 1100 may be performed by one or more components in FIG. 10, as described herein. For example, some or all of the process 1100 may be performed by the vehicle computing device(s) 1004 and/or computing device(s) 1038.

At operation 1102, the process may include receiving sensor data of an environment associated with a vehicle operating on a route. The sensor data may include lidar data, image data (e.g., from one or more cameras, image capture devices, etc.), radar data, sonar data, or the like. In various examples, the sensor data may be data captured by one or more sensors of the vehicle and/or one or more remote sensors, such as sensors associated with other vehicles and/or sensors mounted in the environment.

At operation 1104, the process may include identifying, based at last in part on the sensor data, a parking zone off the route. In some examples, the parking zone may be identified based on a length and a width associated with the parking zone. In some examples, the parking zone may be identified based on one or more markings on the drivable surface, a curb proximate the parking zone, or other means in which a vehicle computing system may identify the parking zone. In some examples, the parking zone may be determined based on map data. In some examples, the parking zone may be determined utilizing the techniques described in U.S. patent application Ser. Nos. 16/587,409 and 15/936,198 incorporated by reference herein above.

At operation 1106, the process may include determining whether one or more preconditions for parking are met. The preconditions for parking may include determining that a parking zone and/or parking location associated therewith is within a first threshold distance of a destination (e.g., goal), that the vehicle is within a second threshold from the parking location, the parking zone and/or the destination, that the parking zone and/or parking location is unoccupied (e.g., no objects are present in the parking zone and/or parking location), and/or that a length and width of the parking zone and/or parking location is visible to the vehicle (e.g., the parking zone and/or parking location is not occluded).

Based on a determination that the preconditions for parking are not met ("No" at operation 1106), the process may identify another parking zone off the route, such as that described with respect to operation 1104.

Based on a determination that the preconditions for parking are met ("Yes" at operation 1106), the process, at operation 1108, may include determining an initial location associated with the vehicle and a parking location associated with the parking zone. The initial location may include a route departure location, such as route departure location 128 of FIG. 1. The initial location may include a first waypoint of two or more waypoints associated with a parking trajectory.

At operation 1110, the process may include determining a reference trajectory from the initial location to the parking location. The reference trajectory may be determined based on a cubic spline, a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., single reference trajectory).

At operation 1112, the process may include determining a driving corridor based at last in part on the reference trajectory and the sensor data. In some examples, the driving corridor may include a drivable surface extending a distance on either side from the reference trajectory. In various examples, the vehicle computing system determine one or more objects within the area defined by the distance extending on either side from the reference trajectory, such as based on the sensor data. In such examples, the vehicle computing system may adjust size and/or shape of the driving corridor based on the determined objects (e.g., static or dynamic objects) in an area defined by the distance extending on either side from the reference trajectory. In some examples, the driving corridor may include the area defined by the distance extending on either side of the reference trajectory from the initial location to the off-route location minus one or more areas associated with the determined object(s). In various examples, the vehicle computing system may fuse the detected object(s) into the drivable surface, such as utilizing the techniques described in U.S. patent application Ser. No. 15/982,694, incorporated herein by reference above.

At operation 1114, the process may include determining a parking trajectory based at least in part on the reference trajectory and the driving corridor. In various examples, the vehicle computing system may apply one or more optimization algorithms to the reference trajectory and/or the driving corridor to determine the parking trajectory. In at least one example, the differential dynamic programming algorithm may be used to determine the parking trajectory.

At operation 1116, the process may include controlling the vehicle based at least in part on the parking trajectory. In various examples, the vehicle computing system may determine to control the vehicle based on a determination that the parking trajectory includes a cost that is lower than a route-based trajectory. In such examples, the determination to control the vehicle may be based on the action associated with parking (e.g., parking action, pull-over action, etc.) may be less than a cost associated with a route-based action, such as continuing straight in a lane, executing a lane change, or the like.

Figure 12:
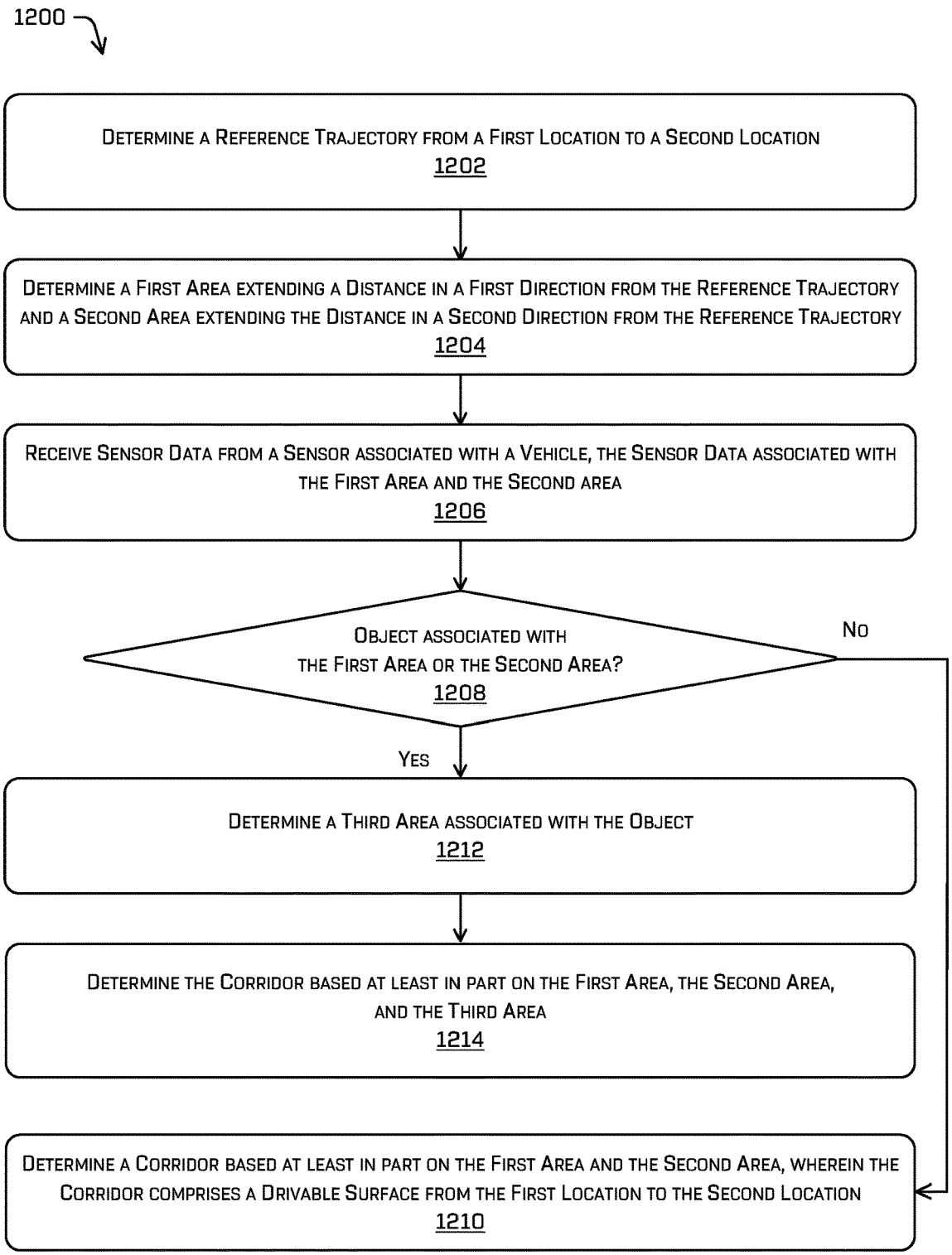
FIG. 12 depicts an example process for determining a driving corridor in an inertial-based reference system, in accordance with embodiments of the disclosure.

FIG. 12 depicts an example process 1200 for determining a driving corridor in an inertial-based reference system, in accordance with embodiments of the disclosure. Some or all of the process 1200 may be performed by one or more components in FIG. 10, as described herein. For example, some or all of the process 1200 may be performed by the vehicle computing device(s) 1004 and/or computing device(s) 1038.

At operation 1202, the process may include determining a reference trajectory from a first location to a second location. The reference trajectory may be determined based on a cubic spline, a Bezier curve, a series of clothoids, and/or any other closed-form boundary condition solution. In some examples, the closed-form boundary condition solution may include a number of free variables that is the same or close to a number of constraints associated therewith. In such an example, the closed-form boundary condition solution may result in a single solution (e.g., single reference trajectory).

At operation 1204, the process may include determining a first area extending a distance in a first direction from the reference trajectory and a second area extending the distance in a second direction from the reference trajectory. In various examples, the first area and the second area may represent an area associated with a drivable surface over which a vehicle may travel.

At operation 1206, the process may include receiving sensor data from a sensor associated with a vehicle, the sensor data associated with the first area and the second area. The sensor data may include lidar data, radar data, image data, sonar data, and the like. In some examples, the sensor data may include data captured by one or more sensors of the vehicle and/or one or more remote sensors, such as those associated with other vehicles and/or mounted in an environment of the vehicle.

At operation 1208, the process may include determining whether an object is associated with the first area or the second area. In some examples, the object may be associated with the first area or the second area based on a determination that the object is located within the first area or the second area. In some examples, the object may be associated with the first area or the second area based on a determination that a predicted trajectory associated with the object may cause the object to enter the first area or the second area. In such examples, the vehicle computing system may determine a path associated with the object, such as based on the predicted trajectory.

Based on a determination that the object is not associated with the first area or the second area ("No" at operation 1208), the process, at operation 1210, may include determining a corridor based at least in part on the first area and the second area, wherein the corridor comprises a drivable surface from the first location to the second location.

Based on a determination that the object is associated with the first area or the second area ("Yes" at operation 1208), the process, at operation 1212, may include determining a third area associated with the object. In some examples, the third area may include an area occupied by the object, such as defined by an outer surface of the object. In some examples, the third area may include the area occupied by the object plus a safety buffer (e.g., additional area extending 6 inches, 1 foot, etc. from the outer surface of the object). In some examples, the area may be defined by a path of the object and/or a safety buffer therefrom. For example, based on a predicted trajectory, the vehicle computing system may determine that an object, a pedestrian, may walk through a corner of the first area. Based on the determination, the vehicle computing system may determine the third area based on the corner of the first area through which the pedestrian may walk.

At operation 1214, the process may include determining the corridor based at least in part on the first area, the second area, and the third area. In various examples, the vehicle computing system may determine the corridor by subtracting the third area from the first area and/or the second area. In such examples, the corridor may be defined by an area surrounding the reference trajectory that is unoccupied by an object. In various examples, determining the corridor (e.g., drivable surface) based on an area that is unoccupied by objects may enhance safety of vehicle operation in the off-route environment.

Figure 13:
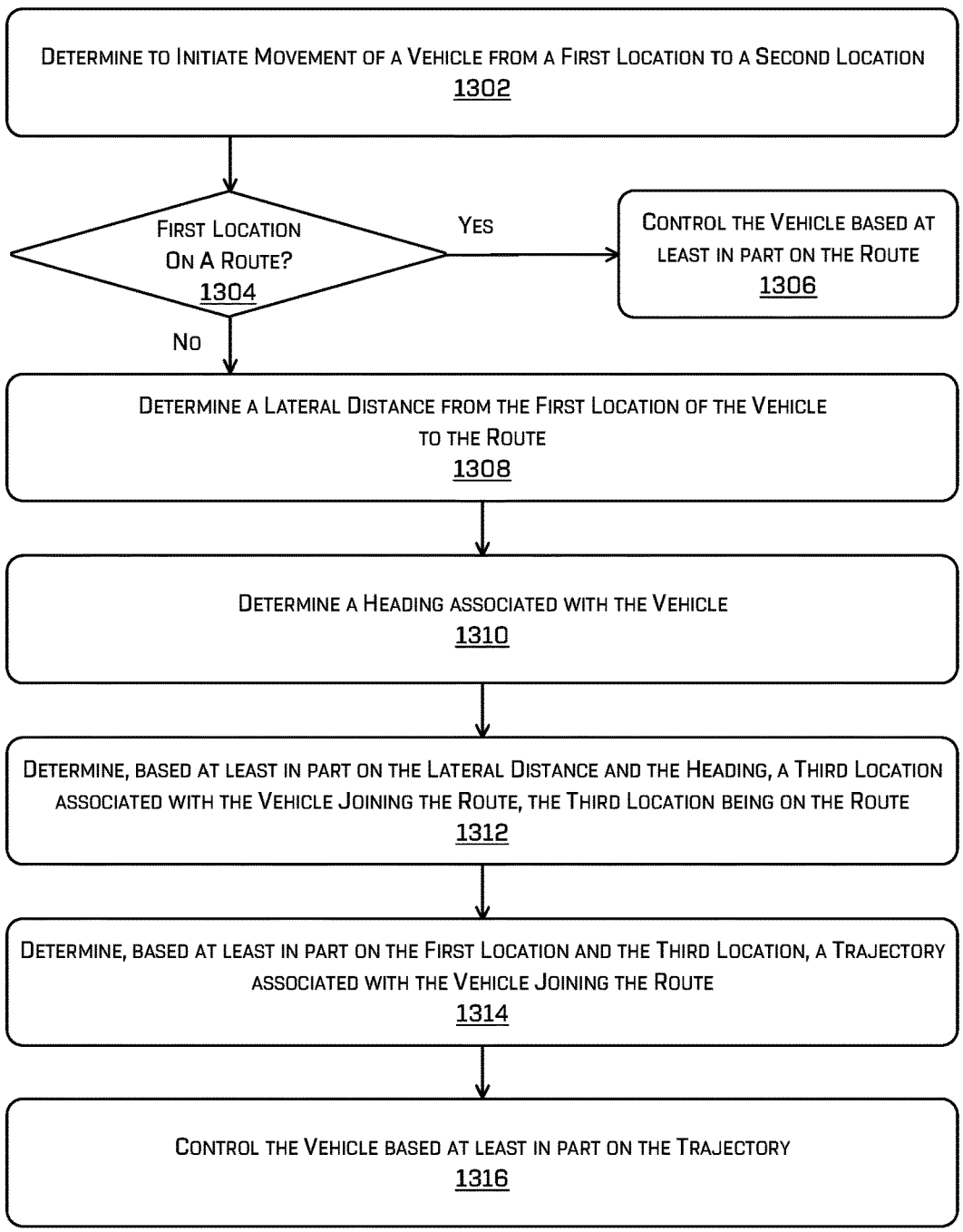
FIG. 13 depicts an example process for controlling a vehicle from a location off a route to a location associated with the route, in accordance with embodiments of the disclosure.

FIG. 13 depicts an example process 1300 for controlling a vehicle from a location off a route to a location associated with the route, in accordance with embodiments of the disclosure. Some or all of the process 1300 may be performed by one or more components in FIG. 10, as described herein. For example, some or all of the process 1300 may be performed by the vehicle computing device(s) 1004 and/or computing device(s) 1038.

At operation 1302, the process may include determining to initiate movement of a vehicle from a first location to a second location. In some examples, the first location may include a parking location, a passenger pickup location, a pull-over location (e.g., for an emergency vehicle, etc.), or the like. In some examples, the second location may include a destination for the vehicle, such as based on a desired location communicated to the vehicle computing system from a passenger requesting transit from the first location to the second location.

At operation 1304, the process may include determining whether the first location is associated with a route. Based on a determination that the first location is associated with the route ("Yes" at operation 1304), the process, at operation 1306, may include controlling the vehicle based at least in part on the route. In some examples, the vehicle computing system may determine one or more route-based trajectories for controlling the vehicle to the second location based on the route.

Based on a determination that the first location is not associated with the route ("No" at operation 1304), the process, at operation 1308, may include determining a lateral distance from the first location of the vehicle to the route.

At operation 1310, the process may include determining a heading associated with the vehicle. In various examples, the vehicle computing system may determine an angular difference between the heading of the vehicle and a direction associated with the route. In some examples, the heading may be based on a direction in which the vehicle is facing at the first location (e.g., orientation and/or position associated with the first location). In such an example, the angular difference between the heading and the direction associated with the route may be based on a heading associated with the front side of the vehicle.

In some examples, the vehicle may include a bi-directional vehicle. In such examples, the vehicle computing system may be configured to drive the vehicle in both directions. In some examples, the vehicle computing system may determine a side of the vehicle that is closest to the route (e.g., a side associated with the smallest lateral distance 210) and may determine the heading and/or angular difference between the heading and the route based on the side that is closest to the route. In various examples, the vehicle computing system may determine the heading associated with a side with a smallest angular difference from the direction associated with the route. In such examples, the vehicle computing system may determine to initiate movement in a direction associated with the smallest angular difference (e.g., least heading error) from the route. In various examples, the determination of a side with which to lead the vehicle out of a parking zone may be based on one or more of a direction of travel associated with the route, an orientation and/or position of the vehicle in the parking zone, objects proximate the parking zone, and/or any other factors that may affect the vehicle control out of a parking zone.

At operation 1312, the process may include determining, based at least in part on the lateral distance and the heading, a third location associated with the vehicle joining the route, the third location being on the route. In some examples, the third location may represent a route return location, such as route return location 132. In various examples, the third location may be determined based on a sigmoid function. In such examples, the lateral distance and/or heading error (e.g., angular difference) may be applied to the sigmoid function to determine the third location. The sigmoid function may include one or more parameters, such as a minimum distance along the route (e.g., 10 meters, 11 feet, 11 yards, etc.), a maximum distance along the route (e.g., 15 meters, 15 feet, 16 yards, etc.), a constant (e.g., steepness factor), a threshold lateral distance between the route and the vehicle, and/or a nominal turning radius associated with the vehicle, as described above. In other examples, the third location may be determined based on one or more other functions, such as a Bezier function, or any other smooth and continuous function constrained by at least a maximum and minimum distance along the route.

At operation 1314, the process may include determining, based at least in part on the first location and the third location, a trajectory associated with the vehicle joining the route. The trajectory may include an off-route trajectory, such as that described above. The off-route trajectory may be determined based on an optimization associated with a reference trajectory and/or a driving corridor (e.g., drivable surface around the reference trajectory). In at least one example, the vehicle computing system may optimize for the trajectory based at least in part on a differential dynamic programming algorithm.

At operation 1316, the process may include controlling the vehicle based at least in part on the trajectory.

EXAMPLE CLAUSES

A: An autonomous vehicle comprising: a sensor; one or more processors; and one or more computer-readable media storing instructions that, when executed by the one or more processors, cause the autonomous vehicle to perform operations comprising: controlling the autonomous vehicle through an environment based at least in part on a route to a destination, wherein the autonomous vehicle is controlled based at least in part on a route-based reference system; determining that the autonomous vehicle operating on the route is within a threshold distance of the destination; identifying, based at least in part on sensor data from the sensor, a stopping location for a vehicle cease forward movement, wherein the stopping location is located off the route and satisfies a condition for stopping; determining an initial location associated with initiating a stopping action, wherein the initial location is associated with the route; determining a vehicle trajectory from the initial location to the stopping location, wherein the vehicle trajectory is determined based at least in part on an inertial-based reference system; determining that the autonomous vehicle is within a threshold distance of the initial location; and based at least in part on the autonomous vehicle being within the threshold distance, controlling the vehicle based at least in part on an inertial-based reference system and the vehicle trajectory.

B: The autonomous vehicle as paragraph A describes, wherein determining the vehicle trajectory comprises: determining a reference trajectory between the initial location and the stopping location; and determining, based at least in part on the reference trajectory, a corridor between the initial location and the stopping location, the corridor indicative of a region of drivable surfaces on either side of the reference trajectory; wherein the vehicle trajectory comprises an optimized trajectory determined based at least in part on the reference trajectory and the corridor.

C: The autonomous vehicle as paragraph B describes, wherein the reference trajectory is determined based at least in part on at least one of: a Bezier curve; a series of clothoids; or a cubic spline curve.

D: The autonomous vehicle as paragraph B describes, wherein determining the corridor comprises: identifying a first area on a first side of the reference trajectory, the first area extending a distance in a first direction from the reference trajectory from the initial location toward the stopping location; identifying a second area on a second side of the reference trajectory, the second area extending the distance in a second direction from the reference trajectory from the initial location toward the stopping location; and performing at least one of: based at least in part on determining that an object is located in at least one of the first area or the second area, removing a section of the at least one of the first area or the second area, wherein the section is associated with the object and the corridor comprises the first area and the second area with the section removed; or based at least in part on determining that the object is not located in the at least one of the first area or the second area, determining that the corridor comprises the first area and the second area.

E: The autonomous vehicle as any one of paragraphs A-D describe, wherein the threshold distance is a first threshold distance and wherein the condition comprises at least one of: the stopping location being within a second threshold distance of the destination; the stopping location being clear of objects; or a length and a width of the stopping location being visible to the autonomous vehicle.

F: A computer-implemented method comprising: determining a first location associated with a vehicle following a first trajectory, the first trajectory based at least in part on a route associated with a first reference system associated with a route-based reference system; identifying a second location for the vehicle to move in an environment, the second location being unassociated with the route; determining that a condition associated with controlling the vehicle off the route to the second location is satisfied; and determining, based at least in part on the condition being satisfied, a second trajectory from the first location to the second location, wherein the vehicle trajectory is determined based at least in part on a second reference system associated with an inertial-based reference system.

G: The computer-implemented method as paragraph F describes, further comprising: controlling the vehicle based at least in part on the vehicle trajectory and the second reference system.

H: The computer-implemented method as either paragraph F or paragraph G describe, wherein determining the vehicle trajectory comprises: determining a reference trajectory between the first location and the second location; and determining, based at least in part on the reference trajectory, a corridor between the first location and the second location, the corridor indicative of a drivable surface on either side of the reference trajectory, wherein the vehicle trajectory comprises an optimized trajectory determined based at least in part on the reference trajectory and the corridor.

I: The computer-implemented method as paragraph H describes, wherein determining the corridor comprises: identifying a first area on a first side of the reference trajectory, the first area extending a distance in a first direction from the reference trajectory from the first location toward the second location; identifying a second area on a second side of the reference trajectory, the second area extending the distance in a second direction from the reference trajectory from the first location toward the second location; receiving sensor data from a sensor associated with the vehicle; and performing at least one of: determining, based at least in part on the sensor data, that an object is located in at least one of the first area or the second area; and based at least in part on determining that he object is located in the at least one of the first area or the second area, removing a section of the at least one of the first area or the second area, wherein the section is associated with the object and the corridor comprises the first area and the second area with the section removed; or determining, based at least in part on the sensor data, that the object is not located in the at least one of the first area or the second area; and based at least in part on determining that the object is not located in the at least one of the first area or the second area, determining that the corridor comprises the first area and the second area.

J: The computer-implemented method as paragraph H describes, wherein the reference trajectory is determined based at least in part on at least one of: a Bezier curve; a series of clothoids; or a cubic spline curve.

K: The computer-implemented method as any one of paragraphs F-J describe, wherein the condition is satisfied at a first time, the method further comprising: determining a first cost associated with the second trajectory; determining a third trajectory associated with the vehicle continuing along the route based at least in part on the first reference system; determining a second cost associated with the third trajectory; determining that the second cost is less than the second cost; and controlling the vehicle based at least in part on the third trajectory and the first reference system.

L: The computer-implemented method as any one of paragraphs F-K describe, further comprising: determining a first cost associated with the first trajectory, wherein the first trajectory is associated with a route-based action; determining a second cost associated with the second trajectory, wherein the second trajectory is associated with an off-route action; determining that the second cost is less than the first cost; and controlling the vehicle based at least in part on the second trajectory based at least in part on determining that the second cost is less than the first cost.

M: The computer-implemented method as paragraph L describes, wherein the off-route action comprises at least one of: a reversing action; a parking action; a pull-over action; or a return to route action.

N: The computer-implemented method as any one of paragraphs F-M describe, wherein determining that the condition is satisfied comprises at least one of: determining that the vehicle is within a first threshold distance of the second location; determining that the second location is within a second threshold distance of a destination; determining that the second location is clear of objects; or determining that the second location is visible to the vehicle.

O: A system or device comprising: a processor; and a non-transitory computer-readable medium storing instructions that, when executed, cause a processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: One or more non-transitory computer-readable media storing instructions that, when executed by one or more processors, cause one or more computing devices to perform operations comprising: determining a first location associated with a vehicle operating on a route in an environment, the route based at least in part on a first reference system associated with a route-based reference system; determining a second location for the vehicle to move in the environment, the second location being unassociated with the route; determining that a condition associated with controlling the vehicle to move to the second location is satisfied; and determining, based at least in part on the condition being satisfied, a vehicle trajectory from the first location to the second location, wherein the vehicle trajectory is determined based at least in part on a second reference system associated with an inertial-based reference system.

R: The one or more non-transitory computer-readable media as paragraph Q describes, wherein determining that the condition is satisfied comprises at least one of: determining that the vehicle is within a first threshold distance of the second location; determining that the second location is within a second threshold distance of a destination; determining that the second location is clear of objects; or determining that the second location is visible to the vehicle.

S: The one or more non-transitory computer-readable media as either paragraph Q or paragraph S describe, wherein the second location is identified at a first time, the operations further comprising: receiving sensor data from a sensor associated with the vehicle; determining, at a second time after the first time, an object in the environment at a location proximate the second location; determining an object trajectory associated with the object; determining, based at least in part on the object trajectory, that the object will be within a threshold distance of the second location at a third time after the second time; determining, based at least in part on determining that the object will be within the threshold distance at the third time, that the condition is not satisfied; and controlling the vehicle based at least in part on the route-based reference system.

T: The one or more non-transitory computer-readable media as paragraph S describes, wherein the vehicle trajectory is a first vehicle trajectory, the operations further comprising: determining that the vehicle is proximate a third location on the route; identifying a fourth location for the vehicle to move off the route; determining that the fourth location satisfies the condition; determining a second trajectory between the third location and the fourth location, the second trajectory being based at least in part on the inertial-based reference system; and controlling the vehicle to the fourth location based at least in part on the second trajectory.

U: The one or more non-transitory computer-readable media as any one of paragraphs Q-T describe, wherein determining the vehicle trajectory comprises: determining a reference trajectory between the first location and the second location; and determining, based at least in part on the reference trajectory, a corridor between the first location and the second location, wherein the vehicle trajectory comprises an optimized trajectory determined based at least in part on the reference trajectory and the corridor.

V: The one or more non-transitory computer-readable media as paragraph U describes, wherein the reference trajectory is determined based at least in part on at least one of: a cubic spline curve; a Bezier curve; or a series of clothoids.

W: A system comprising: one or more processors; and one or more computer-readable media storing instructions that, when executed by the one or more processors, cause the system to perform operations comprising: determining to initiate movement of an autonomous vehicle from a first location, the first location being unassociated with a route; determining a lateral distance between the route and the first location; determining an angular difference between a direction associated with the route and a heading associated with the autonomous vehicle; determining, based at least in part on the lateral distance and the angular difference, a second location associated with the autonomous vehicle joining the route; determining a vehicle trajectory from the first location to the second location; and controlling the autonomous vehicle based at least in part on the vehicle trajectory.

X: The autonomous vehicle as paragraph W describes, wherein the vehicle trajectory is a first vehicle trajectory based at least in part on an inertial-based reference system, the operations further comprising: determining a second vehicle trajectory at a second time, the second vehicle trajectory based at least in part on the inertial-based reference system; determining a first cost associated with the second vehicle trajectory; determining a third vehicle trajectory at the second time, the third vehicle trajectory based at least in part on a route-based reference system; determining a second cost associated with the third vehicle trajectory; determining that the second cost is less than the first cost; and controlling the autonomous vehicle on the route based at least in part on the third vehicle trajectory based at least in part on the second cost being less than the first cost.

Y: The autonomous vehicle as either paragraph W or paragraph X describe, the operations further comprising: determining a nominal turning radius associated with the autonomous vehicle, the nominal turning radius being greater than a minimum turning radius, wherein the second location is further based at least in part on the nominal turning radius.

Z: The autonomous vehicle as any one of paragraphs W-Y describe, wherein the second location is further based on at least one of: a minimum distance for the autonomous vehicle to travel to the route; a maximum distance for the autonomous vehicle to travel to the route; a parameter of a function; or a threshold lateral distance.

AA: The autonomous vehicle as any one of paragraphs W-Z describe, wherein: the first location is associated with a parking location; the route is associated with a lane of a road; and the second location is determined based at least in part on a sigmoid function.

AB: A computer-implemented method comprising: determining to initiate movement of a vehicle from a first location off a route associated with the vehicle toward the route; determining a distance between the first location and the route; determining a heading associated with the vehicle; determining, based at least in part on the distance and the heading, a second location associated with the vehicle joining the route; and determining a vehicle trajectory from the first location to the second location.

AC: The computer-implemented method as paragraph AB describes, wherein determining the vehicle trajectory comprises: determining a reference trajectory between the first location and the second location; determining a first area on a first side of the reference trajectory and a second area on a second side of the reference trajectory; and determining a corridor based at least in part on the first area and the second area, wherein the corridor represents a drivable surface for the vehicle, wherein the vehicle trajectory comprises an optimized trajectory based at least in part on the reference trajectory and the corridor.

AD: The computer-implemented method as either paragraph AB or AC describe, further comprising: controlling the vehicle based at least in part on the vehicle trajectory, wherein the vehicle trajectory is associated with an inertial based reference system for operating the vehicle off the route.

AE: The computer-implemented method as any one of paragraphs AB-AD describe, wherein the second location is determined based at least in part on a function comprising at least one of: a sigmoid function; a Bezier function; or a series of clothoids.

AF: The computer-implemented method as any one of paragraphs AB-AE describe, wherein the vehicle trajectory is a first vehicle trajectory based at least in part on an inertial-based reference system, the method further comprising: determining a second vehicle trajectory at a second time, the second vehicle trajectory based at least in part on the inertial-based reference system; determining a first cost associated with the second vehicle trajectory; determining a third vehicle trajectory at the second time, the third vehicle trajectory based at least in part on a route-based reference system; determining a second cost associated with the third vehicle trajectory; determining that the second cost is less than the first cost; and controlling the vehicle on the route based at least in part on the third vehicle trajectory and the route-based referenced system based at least in part on the second cost being less than the first cost.

AG: The computer-implemented method as any one of paragraphs AB-AF describe, further comprising: determining a direction associated with the route; and determining an angular difference between the heading and the direction associated with the route, wherein the second location is based at least in part on the angular difference.

AH: The computer-implemented method as any one of paragraphs AB-AG describe, further comprising: receiving sensor data associated with an environment of the vehicle; processing the sensor data based at least in part on an inertial-based reference frame; determining an object at a third location associated with the inertial-based reference frame; determining an object trajectory associated with the object; determining that at least one of the third location or the object trajectory conflicts with the vehicle trajectory; and determining to yield to the object based at least in part on the object trajectory conflicting with the vehicle trajectory.

AI: The computer-implemented method as any one of paragraphs AB-AH describe, wherein the second location is further based on at least one of: a turning radius associated with the vehicle; a minimum distance for the vehicle to travel along the route from the first location; a maximum distance for the vehicle to travel along the route from the first location; a parameter of a function; or a threshold lateral distance between the vehicle and the route.

AJ: The computer-implemented method as any one of paragraphs AB-AI describe, wherein the distance is a first distance, the method further comprising: determining an angular difference between the heading and a direction associated with the route; determining, as a limitation, that one or more of the angular difference exceeds a threshold angular difference or the first distance between the first location and the reference is less than a threshold distance; and determining that the first location is off the route based at least in part on the limitation, wherein the vehicle trajectory is associated with maneuvering the vehicle a second distance away from the route while traveling to the second location.

AK: A system or device comprising: a processor; and a non-transitory computer-readable medium storing instructions that, when executed, cause a processor to perform a computer-implemented method as any one of paragraphs AB-AJ describe.

AL: A system or device comprising: a means for processing; and a means for storing coupled to the means for processing, the means for storing including instructions to configure one or more devices to perform a computer-implemented method as any one of paragraphs AB-AJ describe.

AM: One or more non-transitory computer-readable media storing instructions that, when executed by one or more processors, cause one or more computing devices to perform operations comprising: determining to initiate movement of a vehicle from a first location off a route associated with the vehicle toward the route; determining a distance between the first location and the route; determining a heading associated with the vehicle; determining, based at least in part on at least one of the distance or the heading, a second location associated with the vehicle joining the route; and determining a vehicle trajectory from the first location to the second location.

AN: The one or more non-transitory computer-readable media as paragraph AM describes, wherein the second location is determined based at least in part on a sigmoid function.

AO: The one or more non-transitory computer-readable media as either paragraph AM or paragraph AN describes, wherein the vehicle trajectory is a first vehicle trajectory based at least in part on an inertial-based reference system, the operations further comprising: determining that the vehicle is within a threshold distance of the second location at a second time; determining a second vehicle trajectory at the second time, the second vehicle trajectory based at least in part on a route-based reference system; and controlling the vehicle on the route based at least in part on the second vehicle trajectory and the route-based referenced system based at least in part on the vehicle being within the threshold distance.

AP: The one or more non-transitory computer-readable media as any one of paragraphs AM-AO describe, the operations further comprising: determining a direction of travel associated with the route; and determining an angular difference between the heading and the direction of travel associated with the route, wherein the second location is based at least in part on the angular difference.

AQ: The one or more non-transitory computer-readable media as any one of paragraphs AM-AP describe, wherein the second location is further based on at least one of: a turning radius associated with the vehicle; a minimum distance for the vehicle to travel along the route from the first location; a maximum distance for the vehicle to travel along the route from the first location; a parameter of a function; or a threshold lateral distance between the vehicle and the route.

AR: The one or more non-transitory computer-readable media as any one of paragraphs AM-AQ describe, the operations further comprising: receiving sensor data associated with an environment of the vehicle; processing the sensor data based at least in part on an inertial-based reference frame; determining an object at a third location associated with the inertial-based reference frame; determining an object trajectory associated with the object; determining that at least one of the third location or the object trajectory conflicts with the vehicle trajectory; and determining to yield to the object based at least in part on the object trajectory conflicting with the vehicle trajectory.

While the example clauses described above are described with respect to one particular implementation, it should be understood that, in the context of this document, the content of the example clauses can also be implemented via a method, device, system, computer-readable medium, and/or another implementation. Additionally, any of examples A-AR may be implemented alone or in combination with any other one or more of the examples A-AR.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
   a sensor;
   one or more processors; and
   one or more computer-readable media storing instructions that, when executed by the one or more processors, cause the autonomous vehicle to perform operations comprising:
      controlling the autonomous vehicle through an environment based at least in part on a route to a destination, wherein the autonomous vehicle is controlled based at least in part on a route-based reference system;
      determining that the autonomous vehicle operating on the route is within a threshold distance of the destination;
      identifying, based at least in part on sensor data from the sensor, a stopping location for a vehicle cease forward movement, wherein the stopping location is located off the route and satisfies a condition for stopping;
      determining an initial location associated with initiating a stopping action, wherein the initial location is associated with the route;
      determining a vehicle trajectory from the initial location to the stopping location, wherein the vehicle trajectory is determined based at least in part on an inertial-based reference system;
      determining that the autonomous vehicle is within a threshold distance of the initial location; and
      based at least in part on the autonomous vehicle being within the threshold distance, controlling the vehicle based at least in part on an inertial-based reference system and the vehicle trajectory.

2. The autonomous vehicle of claim 1, wherein determining the vehicle trajectory comprises:
   determining a reference trajectory between the initial location and the stopping location; and
   determining, based at least in part on the reference trajectory, a corridor between the initial location and the stopping location, the corridor indicative of a region of drivable surfaces on either side of the reference trajectory;
   wherein the vehicle trajectory comprises an optimized trajectory determined based at least in part on the reference trajectory and the corridor.

3. The autonomous vehicle of claim 2, wherein the reference trajectory is determined based at least in part on at least one of:
   a Bezier curve;
   a series of clothoids; or
   a cubic spline curve.

4. The autonomous vehicle of claim 2, wherein determining the corridor comprises:
   identifying a first area on a first side of the reference trajectory, the first area extending a distance in a first direction from the reference trajectory from the initial location toward the stopping location;
   identifying a second area on a second side of the reference trajectory, the second area extending the distance in a second direction from the reference trajectory from the initial location toward the stopping location; and performing at least one of:

based at least in part on determining that an object is located in at least one of the first area or the second area, removing a section of the at least one of the first area or the second area, wherein the section is associated with the object and the corridor comprises the first area and the second area with the section removed; or based at least in part on determining that the object is not located in the at least one of the first area or the second area, determining that the corridor comprises the first area and the second area.

5. The autonomous vehicle of claim 1, wherein the threshold distance is a first threshold distance and wherein the condition comprises at least one of:

the stopping location being within a second threshold distance of the destination;

the stopping location being clear of objects; or a length and a width of the stopping location being visible to the autonomous vehicle.

6. A method comprising:

determining a first location associated with a vehicle following a first trajectory, the first trajectory based at least in part on a route associated with a first reference system associated with a route-based reference system;

identifying a second location for the vehicle to move in an environment, the second location being unassociated with the route;

determining that a condition associated with controlling the vehicle off the route to the second location is satisfied; and determining, based at least in part on the condition being satisfied, a second trajectory from the first location to the second location, wherein the vehicle trajectory is determined based at least in part on a second reference system associated with an inertial-based reference system.

7. The method of claim 6, further comprising:

controlling the vehicle based at least in part on the vehicle trajectory and the second reference system.

8. The method of claim 6, wherein determining the vehicle trajectory comprises:

determining a reference trajectory between the first location and the second location; and determining, based at least in part on the reference trajectory, a corridor between the first location and the second location, the corridor indicative of a drivable surface on either side of the reference trajectory, wherein the vehicle trajectory comprises an optimized trajectory determined based at least in part on the reference trajectory and the corridor.

9. The method of claim 8, wherein determining the corridor comprises:

identifying a first area on a first side of the reference trajectory, the first area extending a distance in a first direction from the reference trajectory from the first location toward the second location;

identifying a second area on a second side of the reference trajectory, the second area extending the distance in a second direction from the reference trajectory from the first location toward the second location;

receiving sensor data from a sensor associated with the vehicle; and performing at least one of:

determining, based at least in part on the sensor data, that an object is located in at least one of the first area or the second area; and based at least in part on determining that he object is located in the at least one of the first area or the second area, removing a section of the at least one of the first area or the second area, wherein the section is associated with the object and the corridor comprises the first area and the second area with the section removed; or determining, based at least in part on the sensor data, that the object is not located in the at least one of the first area or the second area; and based at least in part on determining that the object is not located in the at least one of the first area or the second area, determining that the corridor comprises the first area and the second area.

10. The method of claim 8, wherein the reference trajectory is determined based at least in part on at least one of:

a Bezier curve;

a series of clothoids; or a cubic spline curve.

11. The method of claim 6, wherein the condition is satisfied at a first time, the method further comprising:

determining a first cost associated with the second trajectory;

determining a third trajectory associated with the vehicle continuing along the route based at least in part on the first reference system;

determining a second cost associated with the third trajectory;

determining that the second cost is less than the second cost; and controlling the vehicle based at least in part on the third trajectory and the first reference system.

12. The method of claim 6, further comprising:

determining a first cost associated with the first trajectory, wherein the first trajectory is associated with a route-based action;

determining a second cost associated with the second trajectory, wherein the second trajectory is associated with an off-route action;

determining that the second cost is less than the first cost; and controlling the vehicle based at least in part on the second trajectory based at least in part on determining that the second cost is less than the first cost.

13. The method of claim 12, wherein the off-route action comprises at least one of:

a reversing action;

a parking action;

a pull-over action; or a return to route action.

14. The method of claim 6, wherein determining that the condition is satisfied comprises at least one of:

determining that the vehicle is within a first threshold distance of the second location;

determining that the second location is within a second threshold distance of a destination;

determining that the second location is clear of objects; or determining that the second location is visible to the vehicle.

15. One or more non-transitory computer-readable media storing instructions that, when executed by one or more processors, cause one or more computing devices to perform operations comprising:

determining a first location associated with a vehicle operating on a route in an environment, the route based at least in part on a first reference system associated with a route-based reference system;

determining a second location for the vehicle to move in the environment, the second location being unassociated with the route;

determining that a condition associated with controlling the vehicle to move to the second location is satisfied; and determining, based at least in part on the condition being satisfied, a vehicle trajectory from the first location to the second location, wherein the vehicle trajectory is determined based at least in part on a second reference system associated with an inertial-based reference system.

16. The one or more non-transitory computer-readable media of claim 15, wherein determining that the condition is satisfied comprises at least one of:

determining that the vehicle is within a first threshold distance of the second location;

determining that the second location is within a second threshold distance of a destination;

determining that the second location is clear of objects; or determining that the second location is visible to the vehicle.

17. The one or more non-transitory computer-readable media of claim 15, wherein the second location is identified at a first time, the operations further comprising:

receiving sensor data from a sensor associated with the vehicle;

determining, at a second time after the first time, an object in the environment at a location proximate the second location;

determining an object trajectory associated with the object;

determining, based at least in part on the object trajectory, that the object will be within a threshold distance of the second location at a third time after the second time;

determining, based at least in part on determining that the object will be within the threshold distance at the third time, that the condition is not satisfied; and controlling the vehicle based at least in part on the route-based reference system.

18. The one or more non-transitory computer-readable media of claim 17, wherein the vehicle trajectory is a first vehicle trajectory, the operations further comprising:

determining that the vehicle is proximate a third location on the route;

identifying a fourth location for the vehicle to move off the route;

determining that the fourth location satisfies the condition;

determining a second trajectory between the third location and the fourth location, the second trajectory being based at least in part on the inertial-based reference system; and controlling the vehicle to the fourth location based at least in part on the second trajectory.

19. The one or more non-transitory computer-readable media of claim 15, wherein determining the vehicle trajectory comprises:

determining a reference trajectory between the first location and the second location; and determining, based at least in part on the reference trajectory, a corridor between the first location and the second location, wherein the vehicle trajectory comprises an optimized trajectory determined based at least in part on the reference trajectory and the corridor.

20. The one or more non-transitory computer-readable media of claim 19, wherein the reference trajectory is determined based at least in part on at least one of:

a cubic spline curve;

a Bezier curve; or a series of clothoids.

* * * * *